(12) United States Patent
Matsushima et al.

(10) Patent No.: US 6,535,717 B1
(45) Date of Patent: Mar. 18, 2003

(54) METHOD, SYSTEM AND APPARATUS FOR TRANSMITTING, RECEIVING, AND REPRODUCING A DIGITAL BROADCAST SIGNAL

(75) Inventors: Kazuhisa Matsushima, Hino (JP); Hideaki Yokoyama, Hino (JP); Hiroshi Okubo, Hino (JP); Tadayoshi Katoh, Kawasaki (JP); Takashi Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/387,157

(22) Filed: Aug. 31, 1999

(30) Foreign Application Priority Data

Aug. 31, 1998 (JP) ............................................ 10-246318

(51) Int. Cl.[7] ............................. H04B 7/14; H04B 7/185
(52) U.S. Cl. ......................... 455/18; 455/15; 455/12.1; 455/10; 370/343; 370/316
(58) Field of Search ..................... 455/10, 11.1, 12.1, 455/18, 427, 414, 450, 451, 454, 15, 3.01, 3.02; 370/343, 344, 316, 410; 725/114, 116, 117; 348/14.12; 375/240.12

(56) References Cited

U.S. PATENT DOCUMENTS

| | | | | |
|---|---|---|---|---|
| 5,253,058 A | * | 10/1993 | Gharavi ................. | 375/240.12 |
| 5,530,701 A | * | 6/1996 | Stillman et al. ............ | 370/410 |
| 5,914,942 A | * | 6/1999 | Hassan et al. .............. | 370/316 |
| 5,914,959 A | * | 6/1999 | Marchetto et al. .......... | 370/468 |
| 6,256,496 B1 | * | 7/2001 | Dintelmann et al. ........ | 455/12.1 |
| 6,292,664 B1 | * | 9/2001 | Ostrup et al. ............... | 455/450 |
| 6,314,269 B1 | * | 11/2001 | Hart et al. .................. | 455/12.1 |
| 6,314,289 B1 | * | 11/2001 | Eberlein et al. ............ | 375/225 |

* cited by examiner

*Primary Examiner*—Tracy Legree
(74) *Attorney, Agent, or Firm*—Katten Muchin Zavis Rosenman

(57) ABSTRACT

The present system comprises a transmitting apparatus for digital broadcast which includes an original signal generating section, delaying section, information amount reducing section, and transmitting section. A receiving and reproducing apparatus for digital broadcast includes a signal reception front stage unit for receiving a high quality signal and a low quality signal, mode determining section and reproducing section composed of a delaying section and selecting section for selectively reproducing the high quality signal and the low quality signal. By employing time diversity, the transmitting apparatus sends the low quality signal having a smaller bandwidth and the high quality signal so that the low quality signal has a preceding time lag relative to the high quality signal, and the receiving apparatus reproduces broadcasting programs. Utilizing the frequency band for broadcast effectively, many broadcasting programs can be increased, and the investment for providing a gap filler can be minimized.

24 Claims, 15 Drawing Sheets

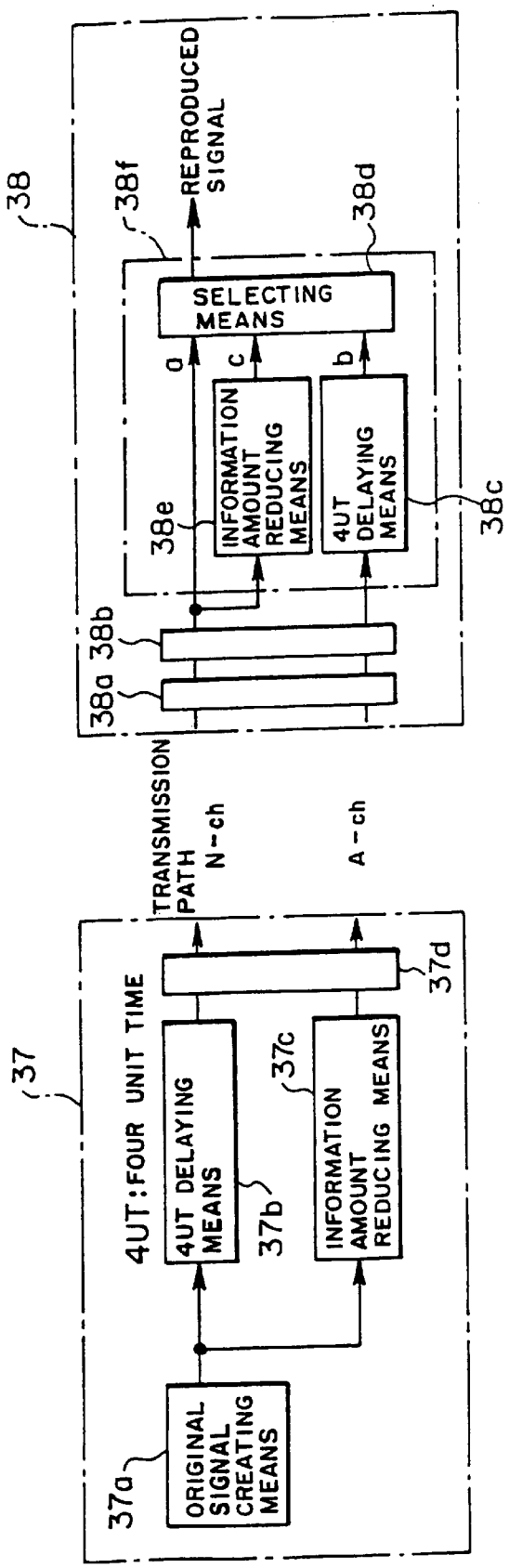

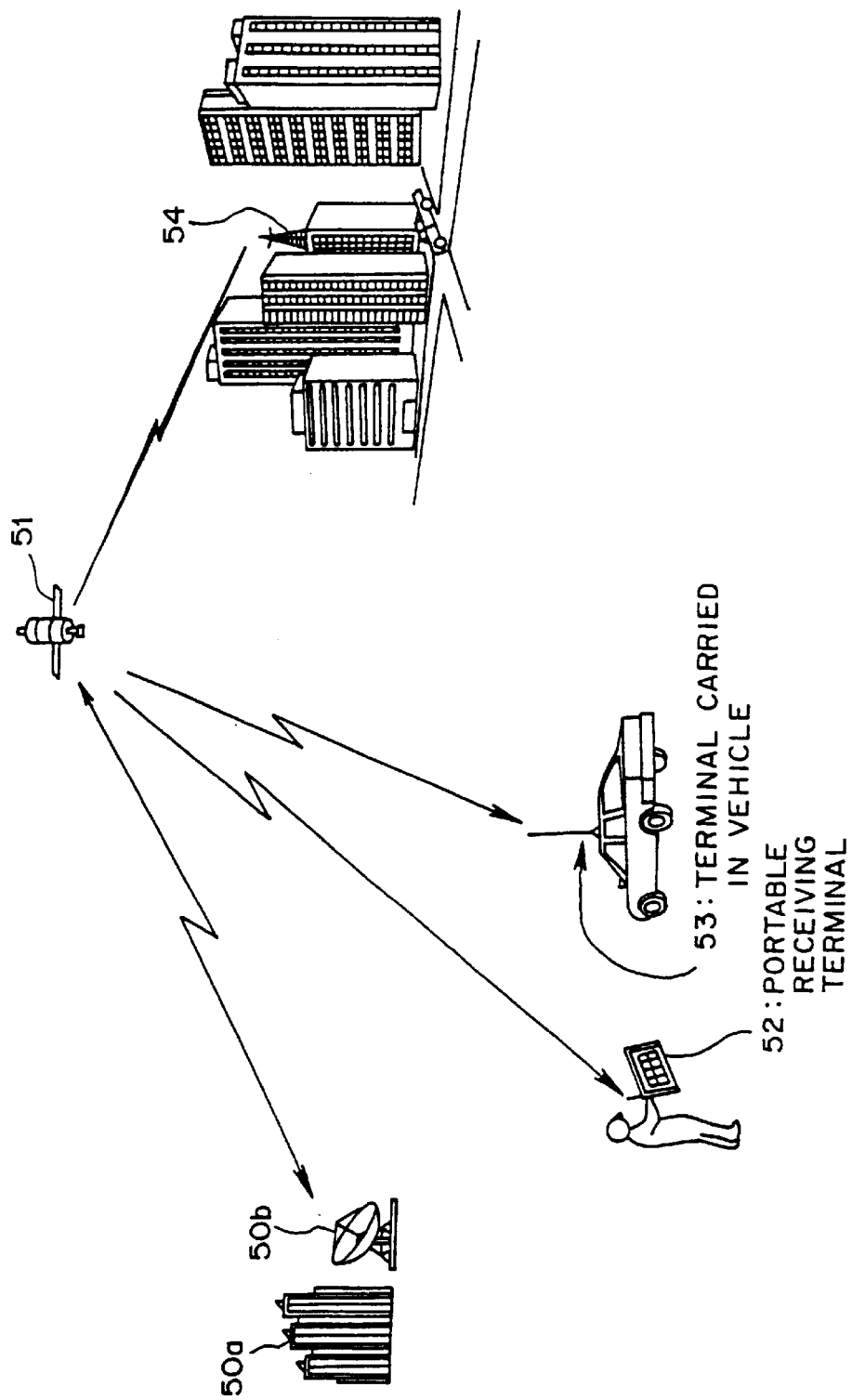

METHOD, SYSTEM AND APPARATUS FOR TRANSMITTING, RECEIVING, AND REPRODUCING A DIGITAL BROADCAST SIGNAL

BACKGROUND OF THE INVENTION (1) Field of the Invention

The present invention relates to a method and system for transmitting a signal and receiving and reproducing the signal in a digital broadcasting situation, and a transmitting apparatus and a receiving and reproducing apparatus used in a digital broadcasting situation, suitable for a system for receiving digital satellite broadcasting by a receiver carried in a mobile unit.

(2) Description of Related Art

Recently, in parallel with putting digital satellite broadcasting into practice, there have been developed and proposed various image data compression system, audio data compression system and the like. Also, there are discussed systems of various manner for receiving digital satellite broadcasting by a receiver carried in a mobile unit.

When a satellite broadcasting is to be received, in general, it is necessary to prepare a parabolic antenna for receiving the radio wave of which frequency is allocated by the authority. Therefore, it was unrealistic for a user of the mobile unit to prepare such an antenna to receive the satellite broadcasting. However, since an S-band (2.6 GHz band) frequency band, which is particularly unsusceptible against rain, is allocated for mobile units to receive the satellite broadcasting, it becomes realistic, for the mobile user for whom proper receiving means was not available, to receive the satellite broadcasting.

When broadcasting is provided for mobile users, a broadcasting receiver receives and reproduces the broadcast digital signal while it is carried in or with moving bodies such as a vehicle, a person, a ship or the like. Therefore, if these moving bodies pass an area near a building, a tree, a bridge, a tunnel or the like, the radio wave transmission path tends to suffer from radio wave cut due to an obstacle. Further, if the receiver is utilized in a stationary fashion, the radio wave transmitted from the broadcasting station also will suffer from radio wave cut due to a moving obstacle, with the result that the broadcast program will suffer from reproduction interruption. Therefore, the receiving side of the broadcast system cannot be provided with a satisfactory broadcasting service due to the disturbance in picture reproduction or audio reproduction. With regard to the disturbance in picture reproduction, if a compensation technology such as a still image retention or the like is effected in the receiving apparatus, uncomfortable feeling of a viewer can be relieved effectively with a relatively easy effort, and it is possible to reproduce images at an acceptable level in visual sensation standpoint. Conversely, if sound reproduction is interrupted on the receiving apparatus, uncomfortable feeling of a listener cannot be relieved effectively with a relatively easy effort even if a countermeasure such as muting or the like is taken. Particularly when an audio broadcasting is provided for mobile users and a driver of a vehicle is paying his/her attention to the reproduced sound intensively, the uncomfortable feeling due to the sound break will affect more badly. Thus, there is a great need in improving the audibility under such situation. Further, under broadcasting situation in which point-to-multipoint communication is carried out, it is substantially impossible to provide a retransmission service for each of the viewers or listeners upon request from receivers of these viewers or listeners. Therefore, it is a responsibility for the communication system to continue the reproduction of the broadcast program without issuing or responding to the retransmission request even if the radio wave cut is brought about.

In order to avoid the above problems, the following countermeasures have been taken.

① A gap filler (radio wave relaying station or retransmission equipment) or the like is installed at a shadow area of a building, a tree, a bridge or the like to which radio wave is not satisfactorily supplied. Alternatively, a plural number of broadcasting satellites remote from one another are utilized for transmitting radio waves.

② Under estimation of time duration of radio wave cut expected when broadcasting is interrupted due to an obstacle in the radio wave path, degree of interleave is decided so that the estimated time duration of radio wave cut can be sufficiently recovered. Thereafter, receiving error in a burst fashion is spread so that error is distributed in a random fashion and then the random error is corrected by using an error correction scheme such as Viterbi coding or Reed-Solomon coding.

③ A plurality of channels are prepared for broadcasting a program at the same quality, and each of the signals of the respective channels are transmitted so as to have a time lag larger than the expected radio wave cut time relative to another, whereby any of the transmitted signals with the time lag among them can be successfully received on the receiving side with the result that the broadcast program can be continuously reproduced.

However, according to the countermeasure numbered one, in order to eliminate all areas in which radio wave is not satisfactorily supplied, great number of gap fillers are necessary, which fact necessitates large amount of investment for supplying and installing the equipment. Further, it is difficult to utilize a plural number of satellites from a practical viewpoint. According to the countermeasure numbered two, it is difficult to correct completely error caused from the radio wave obstacles by the scheme composed of interleave and error correction code. When a program is broadcast in a digital manner, the broadcast program is encoded and compressed in every frame. Therefore, even if a frame contains only one bit error, the frame will not be decoded. Furthermore, according to the countermeasure numbered three, if a broadcasting program of the same quality is broadcast by using a plural number of channels, although it offers a satisfactory solution against the radio wave transmission problem, frequency bands cannot be effectively utilized in spite of the fact that the frequency band is a limited resource.

SUMMARY OF THE INVENTION

The present invention is made in view of the above aspect. According to the present invention for a system in which digital satellite broadcasting using S-band for example is received by a receiver carried in a mobile unit, when a time diversity system in which identical data are transmitted a plural number of times, the invention is employed in a mobile satellite broadcasting system to cope with an obstacle in the broadcast radio wave transmission, a plural number of high quality signals, which require the same bandwidth, are not prepared for transmission from the transmitting side, but a low quality signal data, which requires relatively small bandwidth, is transmitted before the high quality signal data is transmitted. When a receiving side receives the broadcasting program, the receiving side selectively reproduces the low quality signal data having the small transmission bandwidth to recover the reproduction of the broadcasting program with the high quality signal. According to the method of transmitting a signal and receiving and reproducing the signal in a digital broadcasting situation, the system for transmitting a signal and receiving and reproducing the signal in a digital broadcasting situation, and the transmitting apparatus and the receiving apparatus used in a digital broadcasting situation of the present invention, since the low quality signal having a relatively small bandwidth is selectively utilized for recovering the program data transmission with the high quality signal, the frequency band for broadcasting can be effectively utilized, and a number of broadcasting programs can be transmitted within a limited width of frequency band. Furthermore, investment on the broadcasting equipment such as a gap filler or the like can be minimized.

According to the proposed method of the present invention in which a signal is transmitted from a transmitting side and the transmitted signal is received and reproduced on the receiving side in a digital broadcasting situation, the method is carried out in such a manner that, on the transmitting side, a high quality signal is created based on broadcast digital data and at least one low quality signal is created based on the same broadcast digital data so that the quality of the low quality signal is low with respect to that of the high quality signal, and the high quality signal and the low quality signal are transmitted so that one of the signals has a time lag relative to the other, and on the receiving side, the high quality signal is reproduced when a normal receiving mode is effected while the low quality signal is reproduced when a broadcast hindrance mode is effected.

According to the above method, even if reproduction based on the high quality signal is failed on the receiving side, the reproduction of the broadcasting program can be recovered by reproducing the low quality signal which requires relatively small bandwidth to be transmitted. Therefore, the frequency band allocated for broadcasting the programs can be effectively utilized and thus number of programs allowable to be broadcast can be increased. Moreover, cost for system management per unit program can be reduced. In addition, according to the above arrangement, since data transmitted plurality of times need not be completely identical to one another, it is possible to utilize the frequency band for broadcasting effectively while the advantage of time diversity system that investment in providing gap filler or the like can be minimized for carrying out broadcasting.

According to the method of the present invention, on the transmitting side, a plurality of low quality signals different in quality from one another may be prepared as the low quality signal, and the high quality signal and the plurality of low quality signals are transmitted so that each of the signals has a time lag relative to another. The low quality signal may be transmitted before the high quality signal is transmitted. The high quality signal may be transmitted by using a first channel band while the low quality signal may be transmitted by using a second channel band of which width is narrower than that of the first channel band. The high quality signal is transmitted by using a first channel band while each of the low quality signals may be transmitted by using a second channel band of which width is narrower than that of the first channel band. Furthermore, each of the channel bands has a width different from one another.

According to the above proposed methods, the low quality signal created based on the broadcast data identical to that from which the high quality signal is created, is reproduced upon recovering the reproduction of the high quality signal. Therefore, even if the radio wave of the high quality signal is interrupted due to any obstacle upon receiving the signal, the reproduction of the broadcast program can be recovered and continued. Accordingly, a listener of the program can enjoy the program without uncomfortable feeling. Moreover, according to the above proposed methods, the frequency band allocated for broadcasting the programs can be effectively utilized and thus number of programs allowable to be broadcast at a time can be increased. Accordingly, cost for system management per unit program can be reduced. In addition, since the frequency band for broadcasting can be effectively utilized, it is possible to take the advantage of system of time diversity that investment in providing gap filler or the like can be minimized while broadcasting can be carried out.

In addition, when transition is brought about from the normal receiving mode to the broadcast hindrance mode on the receiving side, the high quality signal and the low quality signal may be processed and reproduced so that the transition is effected smoothly in terms of quality of the high quality signal and the low quality signal. Further, on the receiving side, after the broadcast hindrance mode takes place, transition to the normal receiving mode may be prohibited for reproducing the high quality signal until the high quality signal is successfully received for a predetermined time duration or predetermined number of frames.

On the receiving side, if the low quality signal is not received but the high quality signal is received under condition that the broadcast hindrance mode is effected, low quality data may be created from the high quality signal to recover the reproduction of the low quality signal. Further, when transition is brought about from the broadcast hindrance mode to the normal receiving mode on the receiving side, the high quality signal and the low quality signal may be processed and reproduced so that the transition is effected smoothly in terms of quality of the high quality signal and the low quality signal.

According to the above arrangement, broadcast data can be transmitted and received at a satisfactory quality level from practical viewpoint by a simple arrangement, with the result that a number of programs simultaneously broadcast can be increased, and cost for system management per unit program can be reduced. In addition, since the frequency band for broadcasting can be effectively utilized, it is possible to take the advantage of system of time diversity that investment in providing gap filler or the like can be minimized while broadcasting can be carried out.

According to the present invention, there is also provided a system composed of a transmitting apparatus for transmitting a signal and a receiving apparatus for receiving and reproducing the signal transmitted from the transmitting apparatus, both of the apparatus working in a digital broadcasting situation, wherein the transmitting apparatus comprises high quality signal creating means for creating a high quality signal based on broadcast digital data, low quality signal creating means for creating at least one low quality signal based on the same broadcast digital data so that the quality of the low quality signal is relatively low with respect to that of the high quality signal, and transmitting means for transmitting the high quality signal created by the high quality signal creating means and the low quality signal created by the low quality signal creating means so that one of the signals has a time lag relative to the other, and the receiving apparatus is arranged for receiving the high quality signal and the low quality signal transmitted from the transmitting apparatus, and comprises mode determining means for determining which of a normal receiving mode and a broadcast hindrance mode is effected, and reproducing means for reproducing the high quality signal when the normal receiving mode is effected while reproducing the low quality signal when a broadcast hindrance mode is effected.

According to the above arrangement, trouble in receiving radio wave due to a multi-path fading or the like can be reduced by a simply arranged radio wave receiving unit provided in the receiving apparatus.

According to the present invention, there is provided a transmitting apparatus for transmitting broadcasting digital data in a digital broadcasting situation, comprising high quality signal creating means for creating a high quality signal based on broadcast digital data, low quality signal creating means for creating at least one low quality signal based on the same broadcast digital data so that the quality of the low quality signal is relatively low with respect to that of the high quality signal, and transmitting means for transmitting the high quality signal created by the high quality signal creating means and the low quality signal created by the low quality signal creating means so that one of the signals has a time lag relative to the other.

The low quality signal creating means may be arranged to create a plurality of low quality signals different in quality from one another, and the transmitting means may be arranged to transmit the plurality of low quality signals as well as the high quality signal so that each of the low quality signals and the high quality signal has a time lag relative to another.

The transmitting means may be arranged to transmit the low quality signal before transmitting the high quality signal. Further, the high quality signal is transmitted by using a first channel band while the low quality signal is transmitted by using a second channel band of which width is narrower than that of the first channel band. Further, when there are prepared a plurality of low quality signals, the high quality signal is transmitted by using a first channel band while each of the low quality signals is transmitted by using a second channel band of which width is narrower than that of the first channel band. Furthermore, when there are prepared a plurality of low quality signals, each of the channel bandwidths is different from one another.

According to the above arrangement, broadcast data can be transmitted and received at a satisfactory quality level from a practical viewpoint by a simple arrangement, with the result that a number of programs simultaneously broadcast can be increased, and cost for system management per unit program can be reduced. In addition, since the frequency band for broadcasting can be effectively utilized, it is possible to take the advantage of system of time diversity that investment in providing gap filler or the like can be minimized while broadcasting can be carried out.

According to the present invention, there is also provided a receiving apparatus for use with a transmitting apparatus and receiving and reproducing a signal transmitted from the transmitting apparatus in which a high quality signal is created based on broadcast digital data, at least one low quality signal is created based on the same broadcast digital data so that the quality of the low quality signal is low with respect to that of the high quality signal, and the high quality signal and the low quality signal are transmitted so that one of the signals has a time lag relative to the other. The receiving apparatus is characterized by comprising mode determining means for determining which of a normal receiving mode and a broadcast hindrance mode is effected, and reproducing means for reproducing the high quality signal when the normal receiving mode is effected while reproducing the low quality signal when the broadcast hindrance mode is effected.

According to the above arrangement, also broadcast data can be transmitted and received at a satisfactory quality level from practical viewpoint by a simple arrangement, with the result that a number of programs simultaneously broadcast can be increased, and cost for system management per unit program can be reduced. In addition, since the frequency band for broadcasting can be effectively utilized, it is possible to take the advantage of system of time diversity that investment in providing gap filler or the like can be minimized while broadcasting can be carried out.

In the receiving apparatus set forth above, the mode determining means may be arranged to detect transition going to bring about from the normal receiving mode to the broadcast hindrance mode, and when the mode determining means detects the transition going to bring about from the normal receiving mode to the broadcast hindrance mode, the high quality signal and the low quality signal are processed and reproduced so that the transition is effected smoothly in terms of quality of the high quality signal and the low quality signal. Further, the mode determining means may be arranged such that, under condition that the broadcast hindrance mode is effected, the mode determining means does not determine that it is allowable for the normal receiving mode to take place until the high quality signal is successfully received for a predetermined time duration or predetermined number of frames, and the reproducing means may be arranged such that, when the mode determining means determines that it is allowable for the transition to the normal receiving mode to bring about, the reproducing means reproduces the high quality signal. Conversely, the mode determining means may be arranged to detect transition going to bring about from the broadcast hindrance mode to the normal receiving mode, and when the mode determining means detects the transition going to bring about from the broadcast hindrance mode to the normal receiving mode, the high quality signal and the low quality signal may be processed and reproduced so that the transition is effected smoothly in terms of quality of the high quality signal and the low quality signal.

Further, in the receiving apparatus set forth above, the reproducing means may be arranged such that, if the low quality signal is not received but the high quality signal is received under condition that the broadcast hindrance mode is effected, the reproducing means creates low quality data from the high quality signal to recover the reproduction of the low quality signal.

According to the above arrangement, also broadcast data can be transmitted and received at a satisfactory quality level from practical viewpoint by a simple arrangement, with the result that a number of programs simultaneously broadcast can be increased, and cost for system management per unit program can be reduced. In addition, since the frequency band for broadcasting can be effectively utilized, it is possible to take the advantage of the system of time diversity that investment in providing gap filler or the like can be minimized while broadcasting can be carried out.

When the transmitting apparatus of the system according to the present invention is arranged, the high quality signal creating means, the low quality signal creating means and the transmitting means may be provided in the same broadcasting station. Alternatively, the high quality signal creating means may be provided in a broadcasting station, and the low quality signal creating means and the transmitting means are provided in a broadcasting/communication satellite.

According to the above arrangement, the system can be managed with a flexibility. Therefore, if specification change is requested upon constructing the communication system, it is possible to respond to the request with ease and management cost thereof can be reduced.

Further objects and advantages of the present invention will be apparent from the following description which is given with reference to the accompanying drawings wherein preferred embodiments of the present invention is clearly shown.

BRIEF DESCRIPTION OF THE DRAWINGS

FIG. 3 is a simple diagram schematically showing a transmitting and receiving system useful in a digital broadcasting situation according to another embodiment of the present invention;

FIG. 4 is a diagram showing an arrangement of a satellite broadcasting system including an S-band mobile digital broadcasting satellite to which the present invention is applied;

FIG. 12 (c) is a diagram showing an arrangement of reproducing data having been subjected to a smoothing processing;

Figure 1A:
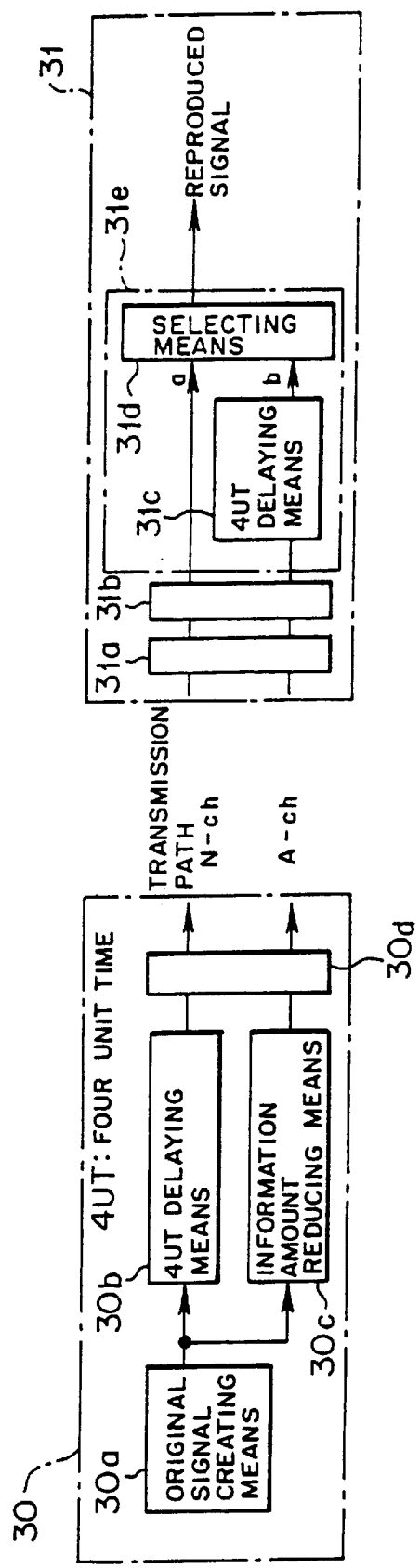
FIG. 1(a) is a diagram schematically showing an arrangement of a transmitting and receiving system useful in a digital broadcasting situation employing a time diversity system to which the present invention is applied.

DESCRIPTION OF THE PREFERRED EMBODIMENTS.

Embodiments of the present invention will hereinafter be described with reference to the attached drawings.

(A) Description of the Embodiments of the Present Invention

FIG. 4 is a diagram showing an arrangement of a system including an S-band mobile digital broadcasting satellite to which the present invention is applied. The satellite broadcasting system shown in FIG. 4 is a system in which multimedia digital information such as music having a quality emulating that of a music reproduced from a compact disk, image data, text data or the like can be broadcast so as to be received all over Japan in a multi-channel fashion, and the broadcast data can be received by a vehicle or a portable terminal having no parabolic antenna. That is, a broadcast program is transmitted from a parabolic antenna 50b installed in a broadcast station 50a to a broadcasting satellite (or communication satellite) 51 by using a Ku-band (14 to 18 GHz band) (up-link). When the broadcast radio wave is transmitted from the broadcasting satellite to the ground side (down-link), S-band (2.6 GHz band) is utilized. Therefore, a portable receiving terminal 52 carried by a man or a terminal 53 carried in a vehicle driven at a high speed can receive the broadcast radio wave containing high definition data such as image data or the like without a parabolic antenna. If there is a place to which radio wave is not supplied from the satellite due to a shadow of a building or the like, a retransmission equipment such as a gap filler 54 or the like is provided to eliminate an area in which the radio wave is not sufficiently supplied.

Figure 5:
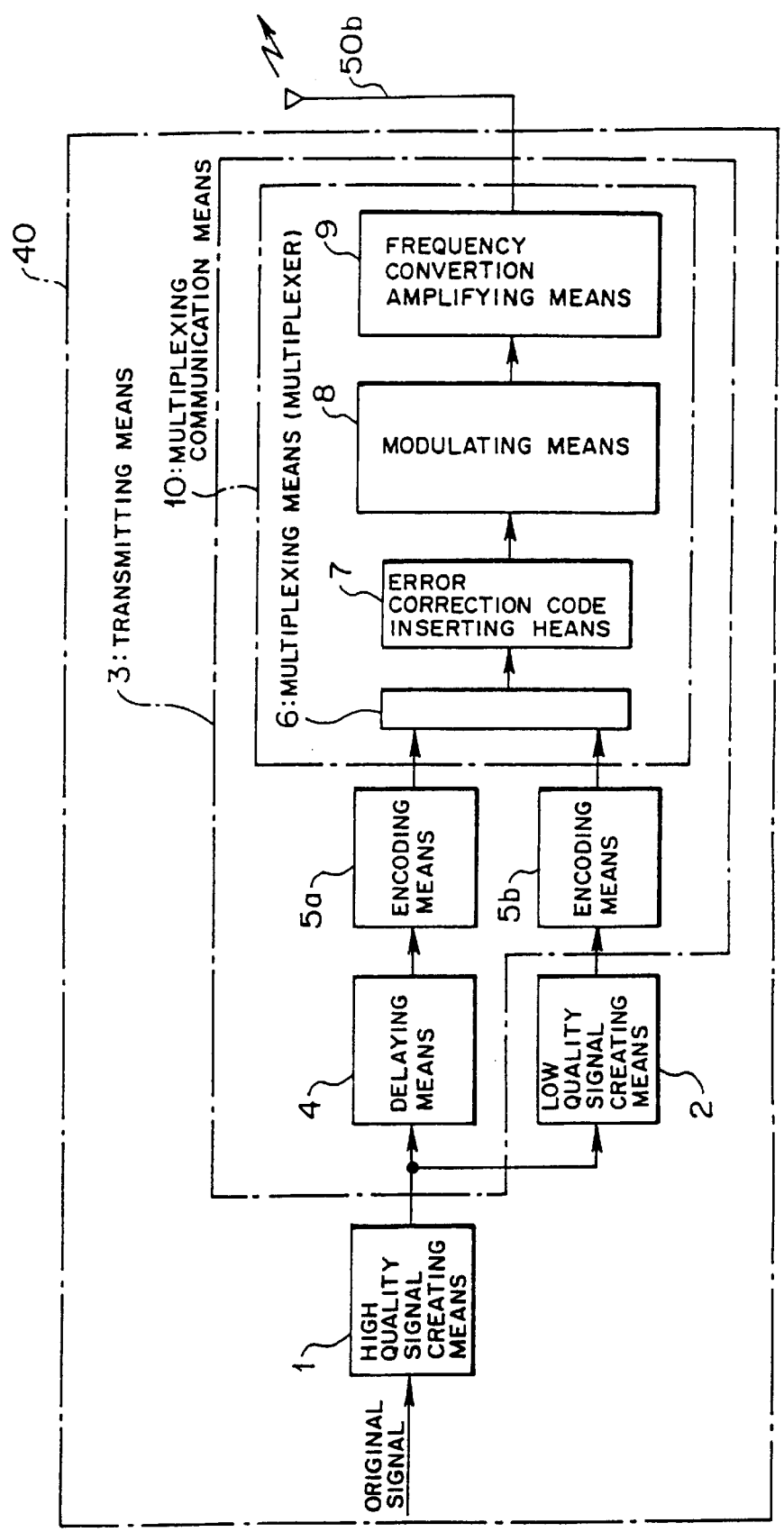
FIG. 5 is a diagram showing in a block form an arrangement of a transmitting apparatus useful in a digital broadcasting situation according to the one embodiment of the present invention.

FIG. 5 is a diagram showing in a block form an arrangement of a transmitting apparatus useful in a digital broadcasting situation according to one embodiment of the present invention. The transmitting apparatus 40 for digital broadcasting shown in FIG. 5 is utilized for transmitting broadcasting digital data. The transmitting apparatus 40 includes high quality signal creating means 1 for creating a high quality signal based on broadcasting digital data, low quality signal creating means 2 for creating at least one low quality signal of which quality is low with respect to that of the high quality signal, based on the broadcasting digital data same as for creating the high quality signal, and transmitting means 3 for transmitting the high quality signal created by the high quality signal creating means 1 and the low quality signal created by the low quality signal creating means 2 so that one of the signals has a time lag relative to the other.

When the transmitting means 3 transmits the high quality signal and the low quality signals, the transmitting means 3 delays the timing of transmission of the high quality signal with respect to the low quality signals, which are created from the same broadcasting digital data. Then, the transmitting means 3 multiplexes the plurality of channels of signals in terms of data arrangement. In order to accomplish the delay and multiplexing operation, the transmitting means 3 includes delaying means 4, encoding means 5a, 5b, and multiplexing communication means 10. In this case, the term "the plurality of channels of signals" means a plurality of low quality signals having a quality lower than that of the high quality signal. These plurality of low quality signals are created from one high quality signal, and then these signals are multiplexed in terms of data arrangement.

The delaying means 4 delays the high quality signal which is generated from the high quality signal creating means 1 by a unit time, e.g., four frames time amount and generates the delayed signal therefrom. Since each of the signals of the channels are transmitted so as to have a time lag larger than an expected radio wave cut relative to another, so that any one of the transmitted signals of broadcasting data having a time lag relative to another can successfully reach the receiving side, with the result that reproduction can be continuously carried out.

The encoding means 5a compresses the high quality signal data having been subjected to the delaying means 4 and encodes the same. The encoding means 5b also compresses at least one low quality signal data generated from the low quality signal creating means 2 and encodes the same. When these encoding means compress data, there are employed an internationally standardized system of MPEG-1 or MPEG-2 or a system of MPEG-4 under the work of standardization or the like which is suitable for digital broadcasting system.

The multiplexing communication means 10 effects multiplexing operation on the high quality data generated from the encoding means 5a and at least one output from the encoding means 5b (actually a plurality of signals) of low quality data, inserts error correction code, modulates and transmits the resulting signal as a radio wave signal. In order to accomplish the above operation, the multiplexing communication means 10 includes a multiplexer (multiplexing means) for multiplexing a high quality data signal channel N-ch generated from the encoding means 5a and at least one low quality data signal channel group A-ch (A1-ch, A2-ch, . . . , An-ch) generated from the encoding means 5b, an error correction code inserting means 7 for carrying out interleave processing on data multiplexed by the multiplexer 6 and inserting an error correction code such as Viterbi code or Reed-Solomon code or the like, modulating means 8 for modulating signal data generated from the error correction code inserting means 7, frequency conversion amplifying means 9 for effecting up-converting on the signal modulated by the modulating means 8 and amplifies the same for transmission, and a parabolic antenna 50b for transmitting the modulated signal amplified for transmission.

According to the above arrangement, material data created by image photographed by a camera or sound picked up by a microphone or the like for broadcasting program is arranged as a high quality signal and partitioned in a unit of frame by the high quality signal creating means 1. Thereafter, the resulting digital data is delayed by, for example, four frame amount (description will hereinafter be provided under the assumption that the delaying amount is four frame amount) by the delaying means 4. On the other hand, the low quality signal creating means 2 creates at least one low quality signal having a quality lower than that of the high quality signal from digital data identical to that from which the high quality signal is created. Then, the encoding means 5a compresses and encodes the high quality signal data delayed by the delaying means 4 while the encoding means 5b compresses and encodes at least one low quality signal data generated from the low quality signal creating means 2.

The resulting digital data is multiplexed by the multiplexer 6 provided in the multiplexing communication means 10. The multiplexed data signal is subjected to an encoding processing so as to be made tough against a burst error. The signal is modulated by the modulating means 8, and the output from the modulating means 8 is subjected to an up-converting processing and amplified for transmission by the frequency conversion amplifying means 9. The resulting modulated signal is released from the parabolic antenna 50b.

Figure 6:
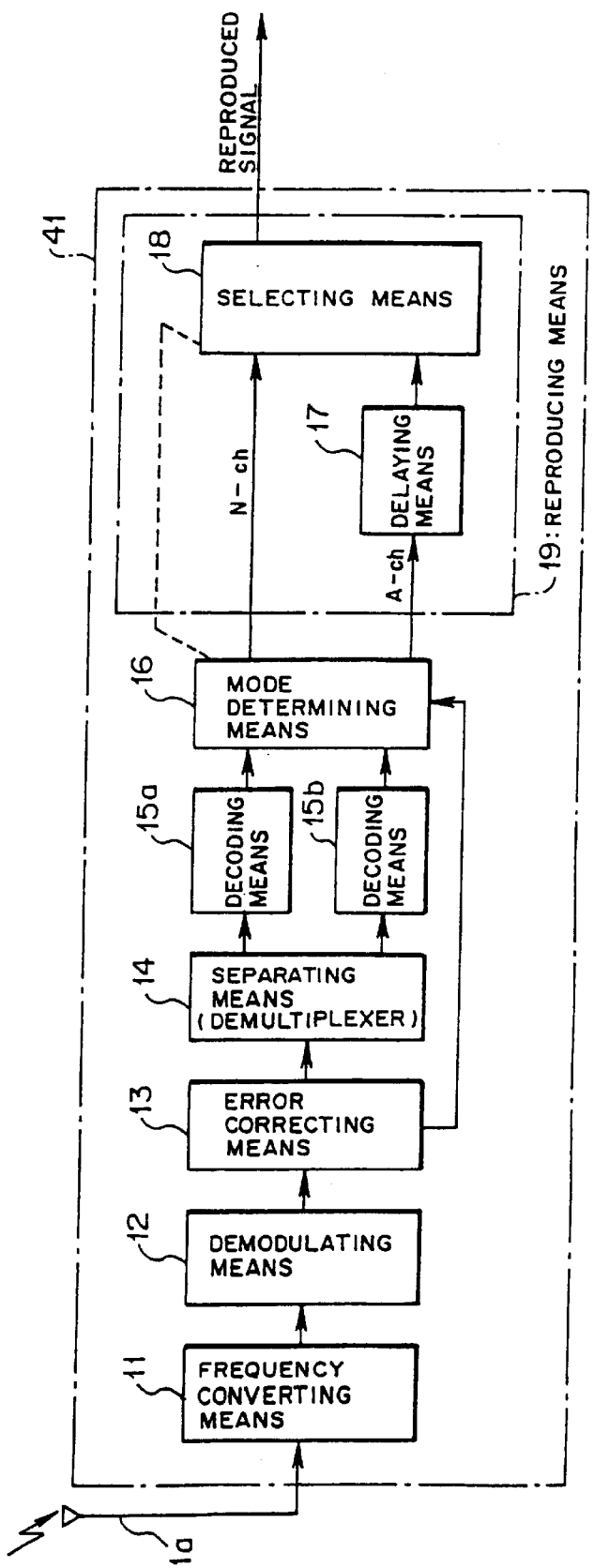
FIG. 6 is a diagram showing in a block form an arrangement of a receiving apparatus useful in a digital broadcasting situation according to the one embodiment of the present invention.

FIG. 6 is a diagram showing in a block form an arrangement of a receiving apparatus useful in a digital broadcasting situation according to one embodiment of the present invention. On a transmitting side, if a high quality signal is created from broadcasting digital data and at least one low quality signal data is also created from the digital data identical to that from which the high quality signal data is created, and these high quality signal and the low quality signal are transmitted so that each of them has a time lag relative to the other, then, the receiving apparatus 41 for use in a digital broadcasting situation shown in FIG. 6 serves as a receiving and reproducing apparatus for use in a digital broadcasting situation capable of receiving and reproducing the high quality signal and the low quality signal. In order to accomplish the above operation, the receiving apparatus 41 includes an antenna 11a, frequency converting means 11, demodulating means 12, error correcting means 13, separating means 14, decoding means 15a and 15b, mode determining means 16, and reproducing means 19.

The antenna 11a serves for receiving a modulated signal, the frequency converting means 11 serves for carrying out down-converting on the received signal, and the demodulating means 12 demodulates the down-converted signal by the frequency converting means 11.

The error correcting means 13 carries out error correcting on the signal generated from the demodulating means 12. The separating means 14 partitions and processes the signal generated from the error correcting means 13 in a unit of frame and demultiplexes the input signal into a high quality data signal on a channel of N-ch and low quality data signals on a channel group of A-ch (A1-ch, A2-ch, . . . , An-ch).

The decoding means 15a decodes compressed coded data of the N-ch data signal separated by the separating means 14. The decoding means 15b decodes compressed coded data of the group of channels of A-ch (A1-ch, A2-ch, . . . , An-ch) data signals separated by the separating means 14.

The mode determining means 16 determines which of a normal receiving mode and a broadcast hindrance mode takes place. The normal receiving mode means that the high quality signal is successfully received, so that the broadcast program can be satisfactorily reproduced. The broadcast hindrance mode means that the high quality signal is not successfully received, so that the broadcast program cannot be reproduced from the high quality signal. When the mode determining means 16 determines that the normal receiving mode takes place, then the reproducing means 19 selects the high quality signal for reproduction. Conversely, when the mode determining means 16 determines that the broadcast hindrance mode takes place, then the reproducing means 19 selects the low quality signal for reproduction. In order to accomplish the above operation, the reproducing means includes delaying means 17 and selecting means 18.

The delaying means 17 delays the low quality signal out of the decoded signals, by a unit time, e.g., four frame amount. The selecting means 18 selects the high quality signal on the channel of N-ch when the normal receiving mode takes place while selects the group of low quality signals on the channel of A-ch (A1-ch, A2-ch, . . . , An-ch)when the broadcast hindrance mode takes place, in conjunction with the mode determining means 16.

In this way, the coded modulated signal is transmitted in a unit of frame from the transmitting apparatus 40 for digital broadcasting provided in the broadcasting station 50a by way of the broadcasting satellite 51. The transmitted signal is received by the receiving apparatus 41 for the digital broadcasting at the antenna 11a. When the signal is received, the received signal is down-converted by the frequency converting means 11 and demodulated by the demodulating means 12. Thereafter, the demodulated signal generated from the demodulating means 12 is subjected to an error correction processing in the error correcting means 13. The error-corrected signal is supplied to the separating means 14 in which it is demultiplexed or partitioned in a unit of frame to produce a high quality data signal on the channel of N-ch and a plurality of low quality data signals on the channels of A-ch (A1-ch, A2-ch, . . . , An-ch). The decoding means 15a decodes the encoded compressed signal data on the channel of N-ch separated by the separating means 14. The decoding means 15b also decodes the encoded compressed signal data group on the channel of A-ch (A1-ch, A2-ch, . . . , An-ch) separated by the separating means 14.

If the error correcting means 13 fails to correct the data and at the same time the decoding means 15a or the decoding means 15b fails to decode the data, the mode determining means 16 determines that the broadcast hindrance mode is brought about as a receiving mode. If otherwise takes place, the mode determining means 16 determines that the receiving mode is the normal receiving mode. The selecting means 18 provided in the reproducing means 19 selects any one from the channel N-ch for the high quality data signal and the channel A-ch (A1-ch, A2-ch, . . . , An-ch) for the plurality of low quality data signals, depending on the determination made by the mode determining means 16. In other words, when it is determined that the normal receiving mode takes place, the high quality signal from the decoding means 15a is selected for reproduction and the reproduced signal is generated. When it is determined that the broadcast hindrance mode takes place, the low quality signal from the decoding means 15b is delayed by four frame amount by the delaying means 17 and then selected by the selecting means 18 to be reproduced. A picture signal and an audio signal are extracted from the reproduced signal of the receiving apparatus 41 for digital broadcast and then the extracted picture signal is supplied to a video display circuit (not shown) while the audio signal is supplied to an audio amplifying circuit (not shown). Thus, a viewer can enjoy the broadcast program by means of a proper display apparatus and a speaker.

Figure 7:
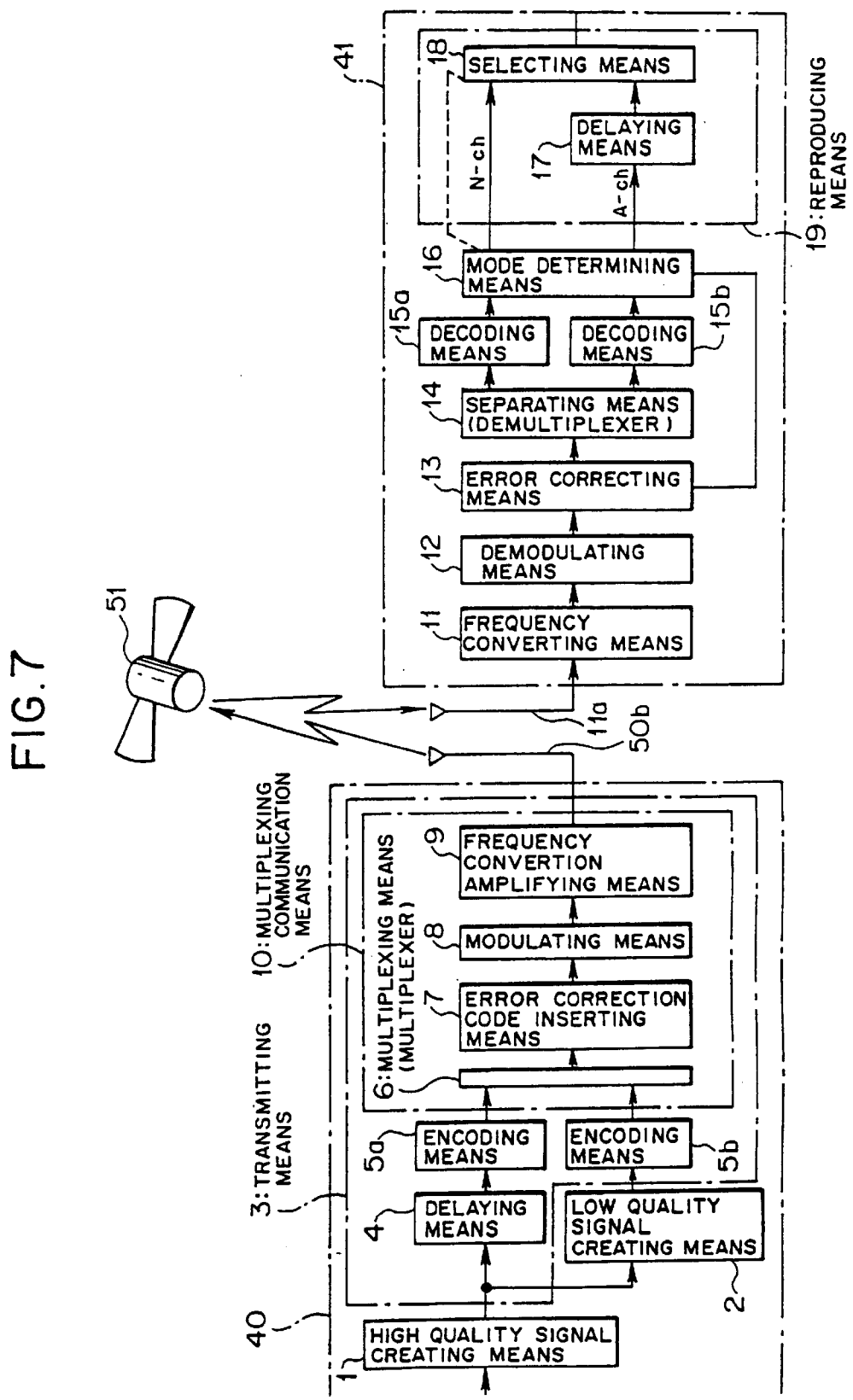
FIG. 7 is a diagram showing in a block form an arrangement of a transmitting and receiving system useful in a digital broadcasting situation according to the one embodiment of the present invention.

As shown in FIG. 7, broadcast digital data is transmitted from the transmitting apparatus 40 for digital broadcast to the broadcasting satellite 51 and then the broadcast radio wave is transmitted from the broadcasting satellite 51 to the ground. The receiving apparatus 41 for digital broadcast receives the broadcast radio wave. In this way, transmission and reception of the broadcast digital data can be accomplished.

The transmitting apparatus 40 for digital broadcasting shown in FIG. 7 is utilized for creating high quality signal based on broadcasting digital data and also creates a plurality of low quality signals of which quality is lower than that of the high quality signal, based on the broadcasting digital data same as for creating the high quality signal. Then, the transmitting apparatus 40 transmits the high quality signal and the low quality signal so that one of the signals has a time lag relative to another. As described above, the transmitting apparatus 40 includes the high quality signal creating means 1, the low quality signal creating means 2, and the transmitting means 3. The transmitting means 3 includes the delaying means 4, the encoding means 5a, 5b, and the multiplexing communication means 10. Further, the multiplexing communication means 10 includes the multiplexer 6, error correction code inserting means 7, the modulating means 8, the frequency conversion amplifying means 9, and a parabolic antenna 50b.

The broadcasting satellite 51 shown in FIG. 7 is arranged to receive the high quality signal and the low quality signals transmitted so that each of the signals has a time lag relative to another from the transmitting apparatus 40 for digital broadcasting usually located on the ground. The broadcasting satellite 51 also frequency-converts the received signal into those in an S-band and sends the corresponding broadcasting radio waves.

The receiving apparatus 41 for digital broadcast shown in FIG. 7 is arranged to receive the broadcasting radio waves and reproduces the high quality signal and the low quality signals. As described above, the receiving apparatus 41 for digital broadcast includes the antenna 11a, the frequency converting means 11, the demodulating means 12, the error correcting means 13, the separating means 14, the decoding means 15a and 15b, the mode determining means 16, and the reproducing means 19. The reproducing means 19 includes the delaying means 17 and the selecting means 18.

That is, the transmitting and receiving (transmitting /receiving and reproducing) system for digital broadcast is composed of the transmitting apparatus 40 and the receiving apparatus 41. The transmitting apparatus 40 is arranged to transmit broadcast digital data and includes the high quality signal creating means 1 for creating the high quality signal based on broadcast digital data, the low quality signal creating means 2 for creating the plurality of low quality signals of which quality is lower than that of the high quality signal, based on the digital broadcast data identical to that from which the high quality signal is created, the transmitting means 3 for transmitting the high quality signal and the low quality signals so that each of the signals has a time lag relative to another. The transmitting means 3 includes the delaying means 4, the encoding means 5a, 5b, and the multiplexing communication means 10, whereby the high quality signal created by the high quality signal creating means 1 and the low quality signals created by the low quality signal creating means 2 are transmitted so that each of the signals has a time lag relative to another. The receiving apparatus 41 for digital broadcast, which constitutes the system together with the transmuting apparatus 40, is arranged to receive the high quality signal and the low quality signals transmitted from the transmitting apparatus 40 for digital broadcast, and includes the antenna 11a, the frequency converting means 11, the demodulating means 12, the error correcting means 13, the separating means 14, and the decoding means 15a and 15b. In addition to the above components, the receiving apparatus 41 includes the mode determining means 16 for determining which of a normal receiving mode and a broadcast hindrance mode takes place, and the reproducing means 19 for selectively reproducing the high quality signal when the mode determining means 16 determines that the normal receiving mode takes place and reproducing the low quality signal when the mode determining means 16 determines that the broadcast hindrance mode takes place.

In this case, the high quality signal creating means 1, the low quality signal creating means 2 and the transmitting means 3 constituting the transmitting apparatus 40 are provided within the same broadcasting station 50a.

According to the present embodiment, a time diversity system in which data are transmitted plurality of times is employed so as to deal with a trouble caused from broadcast radio wave cut. According to the time diversity system employed in the embodiment, unlike an ordinary time diversity system in which the same frequency band is prepared each time a high quality data signal is transmitted repeatedly, the low quality data signal requiring a smaller transmission bandwidth is transmitted before the high quality data signal is transmitted, and on the receiving side, the low quality data signal requiring the smaller transmission bandwidth is received and utilized for recovering the reproduction of the broadcast program. According to the above arrangement, the receiving apparatus 41 on the receiving side becomes capable of reproducing the broadcast program even with the low quality data signal requiring the smaller transmission bandwidth. Therefore, broadcasting can be carried out by the low quality signal requiring a smaller frequency bandwidth, with the result that the frequency band for broadcasting can be effectively utilized. Further, according to the above arrangement, since the data transmitted plurality of times need not be completely identical to one another, it is possible to utilize the frequency band for broadcasting effectively, and thus number of programs allowable to be broadcast at a time can be increased. Accordingly, cost for system management per unit program can be reduced.

A mode for carrying out the time diversity system according to the present embodiment will hereinafter be described with reference to FIG. 1(a) and FIG. 3. In order to make the time diversity system according to the present invention comparable with an ordinary time diversity system, the ordinary time diversity system will be described together with reference to FIG. 2(a).

FIG. 1(a) is a diagram schematically showing an arrangement of a transmitting and receiving system useful in a digital broadcasting situation employing a time diversity system to which the present invention is applied. As shown in FIG. 1(a), a transmitting apparatus 30 for digital broadcast is arranged to divide an original signal into a high quality signal and a group of low quality signals on a plurality of channels, and send the high quality signal on a channel of N-ch and a group of low quality signals on the channel A-ch (A1-ch, A2-ch, . . . , An-ch). The transmitting apparatus 30 includes original signal creating means 30a, 4UT (four unit time) delaying means 30b, information amount reducing means 30c and transmitting means 30d.

When a plurality of broadcasting data signals are transmitted by using the channels of N-ch and A-ch (A1-ch, A2-ch, . . . , An-ch), a frame transmitting system of a time division method is employed. The plurality of data signals are transmitted at the same frequency band so that each of the signals has a time lag relative to another. The term "channel" in this case means a time packet allocated to each signal upon broadcasting the signals.

In this case, the original signal creating means 30a serves for creating the high quality signal, and it corresponds to the aforesaid high quality signal creating means 1. The 4UT delaying means 30b serves for delaying the high quality signal created by the original signal creating means 30a by four frame amount and generating the resulting signal, and it corresponds to a part of the aforesaid transmitting means 3.

The information amount reducing means 30c serves for creating the low quality signal and it corresponds to the aforesaid low quality signal creating means 2. The information amount reducing means 30c reduces the information data amount of the high quality signal to create the low quality signal. The concrete means for carrying out the reduction is such that a digital filter is employed to make half the frequency band required for transmitting the signal or remove the lower 8-bit data from 16-bit data so that resolution is made half, for example.

The transmitting means 30d is arranged to multiplex outputs of the 4UT delaying means 30b and the information amount reducing means 30c and send the multiplexed data in a radio wave fashion. Therefore, the transmitting means 30d includes components corresponding to the encoding means 5a and 5b and the multiplexing communication means 10 as set forth above in regard to the transmitting means 3. Thus, these components will not be further described.

In the above arrangement, the high quality signal on the channel N-ch delayed by four frame amount generated from the 4UT delaying means 30b and the low quality signals on the group of channels A-ch (A1-ch, A2-ch, . . . , An-ch) generated from the information amount reducing means 30c are multiplexed and sent in a radio wave fashion.

On the other hand, the receiving apparatus 31 for use in a digital broadcasting situation shown in FIG. 1(a) is arranged to selectively reproduce the plurality of signals sent on the channels N-ch and the group of channels A-ch (A1-ch, A2-ch, . . . , An-ch). The receiving apparatus 31 includes a signal reception front stage unit 31a for receiving the radio wave signals, frequency-converting, demodulating, error correcting, separating and decoding the received signals, mode determining means 31b for determining which of the normal receiving mode and the broadcast hindrance mode is effected, and reproducing means 31e composed of 4UT delaying means 31c and selecting means 31d.

The operations carried out in the signal reception front stage unit 31a, that is, receiving the radio wave signals, frequency-converting, demodulating, error correcting, separating and decoding the received signals, are same as those carried out by the antenna 11a, the frequency converting means 11, the demodulating means 12, the error correcting means 13, the separating means 14, and the decoding means 15a and 15b provided in the above-described receiving apparatus 41 for digital broadcasting. Therefore, these operations will not be further described.

The mode determining means 31b corresponds to the mode determining means 16 provided in the reproducing means 19 of the above-described receiving apparatus, and it is arranged to determine which of the normal receiving mode and the broadcast hindrance mode is effected on the current receiving state of the data generated from the signal reception front stage unit 31a.

When the mode determining means 31b determines that the normal receiving mode is effected, then the reproducing means 31e selectively reproduces the high quality signal. Conversely, when the mode determining means 31b determines that the broadcast hindrance mode is effected, then the reproducing means 31e selectively reproduces the low quality signal. The 4UT delaying means 31c corresponds to the delaying means 17 provided in the receiving means 19 of the above-described receiving apparatus 41, and is arranged to delay the group of low quality signals transmitted on the channels A-ch (A1-ch, A2-ch, . . . , An-ch) included in the data transmitted in the radio wave fashion, by four frame amount. The selecting means 31d corresponds to the selecting means 18 provided in the reproducing means 19 of the same receiving apparatus 41, and is arranged to select one of the high quality signal sent on the channel N-ch and the group of low quality signals delayed by the 4UT delaying means 31c and generates the selectively reproduced signal.

Figures 2A, 2B:
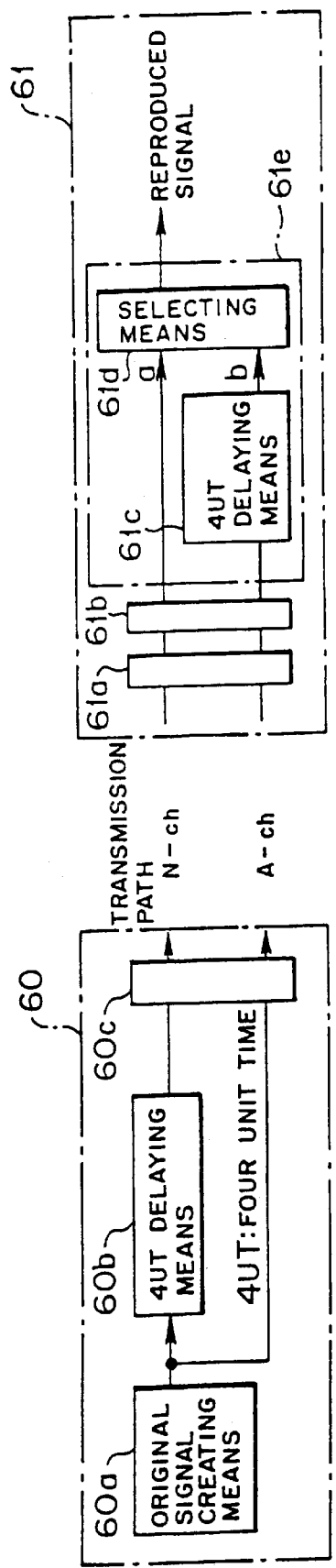
FIG. 2(a) is a diagram schematically showing a transmitting and receiving system useful in a digital broadcasting situation operated in an ordinary time diversity system.
FIG. 2(b) is a diagram showing an arrangement of transmitting frames when the frames are transmitted in a primitive time diversity system.

On the other hand, FIG. 2(a) is a diagram showing a transmitting and receiving system useful in a digital broadcasting situation in an ordinary time diversity system. The arrangement shown in FIG. 2 (a) is provided for comparison with the arrangement of the time diversity system employed in the present invention. As shown in FIG. 2(a), the transmitting apparatus 60 for use in a digital broadcasting situation is arranged to send two channels of signals deriving from the same original signal and having the same quality. One of the signals is transmitted on the channel N-ch while the other of the signals is transmitted on the channel A-ch. Therefore, similarly to the above-described transmitting apparatus 30 for use in a digital broadcasting situation, the transmitting apparatus 60 includes an original signal creating means 60a, 4UT delaying means 60b and transmitting means 60c. The original signal creating means 60a, the 4UT delaying means 60b and the transmitting means 60c are similarly arranged to the original signal creating means 30a, the 4UT delaying means 30b and the transmitting means 30d, respectively. Therefore, they will not be further described.

However, the transmitting apparatus 60 for use in a digital broadcasting situation lacks means for creating a low quality signal which corresponds to the above information amount reducing means 30c. Thus, the transmission speed of the channel of N-ch and the transmission speed of the channel A-ch become identical to each other.

According to the arrangement of the receiving apparatus 61 shown in FIG. 2(a), since the ordinary time diversity system is employed, one of the two signals having the same quality and transmitted on the two channels is received on the channel N-ch while the other of the two signals is received on the channel A-ch, and either of the signals is selectively reproduced. Similarly to the above-described receiving apparatus 31, the receiving apparatus 61 includes a signal reception front stage unit 61a for receiving the radio wave signals, frequency-converting, demodulating, error correcting, separating and decoding the received signals, mode determining means 61b for determining which of the normal receiving mode and the broadcast hindrance mode is effected, and reproducing means 61e composed of 4UT delaying means 61c and selecting means 61d. The signal reception front stage unit 61a, the mode determining means 61b, the 4UT delaying means 61c and the selecting means 61d are similarly arranged to the signal reception front stage unit 31a, the mode determining means 31b, the 4UT delaying means 31c and the selecting means 31d, respectively. Further, the reproducing means 61e is similarly arranged to the reproducing means 31e. Therefore, they will not be further described.

Now, another mode of arrangement in which the present invention can be applied will be described with reference to FIG. 3. A transmitting apparatus 37 for use in a digital broadcasting situation shown in FIG. 3 is similarly arranged to the transmitting apparatus 30 for use in a digital broadcasting situation, as set forth above. That is, the transmitting apparatus 37 includes an original signal creating means 37a, 4UT delaying means 37b, information amount reducing means 37c, and transmitting means 37d. The original signal creating means 37a, the 4UT delaying means 37b, the information amount reducing means 37c and the transmitting means 37d are similarly arranged to the original signal creating means 30a, the 4UT delaying means 30b, the information amount reducing means 30c and the transmitting means 30d, respectively. Therefore, they will not be further described.

A receiving apparatus 38 for use in a digital broadcasting situation shown in FIG. 3 is arranged to include a signal reception front stage unit 38a for receiving the radio wave signals, frequency-converting, demodulating, error correcting, separating and decoding the received signals, mode determining means 38b for determining which of the normal receiving mode and the broadcast hindrance mode is effected, and reproducing means 38f composed of 4UT delaying means 38c, selecting means 38d and information amount reducing means 38e.

The signal reception front stage unit 38a, the mode determining means 38b, the 4UT delaying means 38c and the selecting means 38d are similarly arranged to the signal reception front stage unit 31a, the mode determining means 31b, the 4UT delaying means 31c and the selecting means 31d, respectively. Therefore, they will not be further described. Further, the information amount reducing means 38e is arranged to reduce information amount by decimating the high quality signal thereby to create a low quality signal, and detailed description thereof will not be provided. Furthermore, the reproducing means 38f is similarly arranged to the reproducing means 31e. Therefore, they will not be further described.

A digital broadcasting can be carried out by using the above arrangement to which the time diversity system according to the present invention is applied. The method for carrying out transmission and reception in a digital broadcasting situation will be described with reference to FIG. 1(b) and FIG. 2(b).

Figure 1B:
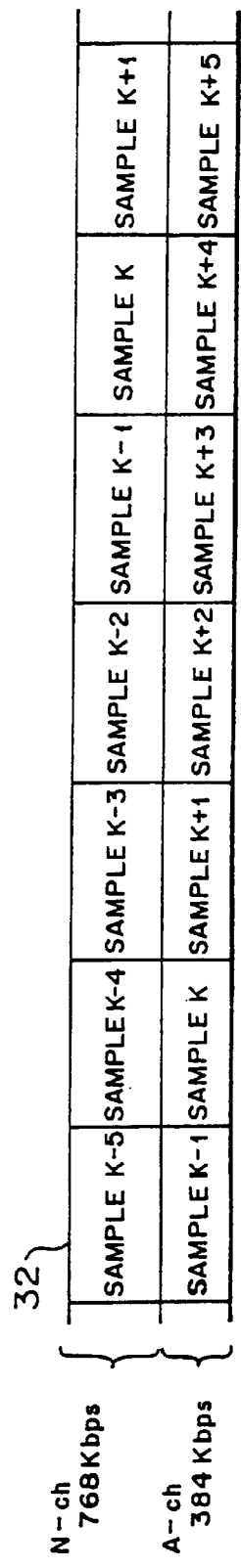
FIG. 1(b) is a diagram showing a transmitting frame arrangement of the time diversity system according to one embodiment of the present invention.

FIG. 1(b) is a diagram showing a transmitting frame arrangement of the time diversity system according to one embodiment of the present invention. A frame data arrangement 32 shown in FIG. 1(b) is an arrangement of a data signal having a required bandwidth of 1152 Kbps, which is derived from adding a band of 768 Kbps utilized for transmitting the high quality data signal on the channel of N-ch generated from the 4UT delaying means 30b provided within the transmitting apparatus 30 for use in a digital broadcasting, and a band of 384 Kbps utilized for transmitting the low quality data signal on the channel of A-ch generated from the information amount reducing means 30c also provided within the transmitting apparatus 30 for use in a digital broadcasting. In this case, each of the numbers, 768 Kbps and 384 Kbps, represents an information amount of the high quality signal and the low quality signal. If a signal frequency bandwidth is set to 20 kHz, a sampling frequency is set to 48 kHz, and resolution is set to 16 bits, then the signal information amount (bandwidth) of the signal upon quantization becomes 768 Kbps. If an ordinary time diversity system is employed, the high quality signal of 768 Kbps is transmitted a plurality of times, e.g., twice. Thus, there is required a transmission speed of 1536 Kbps in total. Conversely, if the signal is reduced in its information amount to have a resolution of 8 bits, the corresponding signal information amount (bandwidth) is 384 Kbps. The plurality of low quality signals are regarded to have a frequency band smaller than the frequency band of 384 Kbps in the following description.

The original signal creating means 30a creates an original signal in a high quality fashion, and the information amount reducing means 30c reduces the information amount to create the low quality signal. The high quality signal is delayed by four unit time amount in the 4UT delaying means 30b. Now, concept relating to how sampled data are ordered will be described.

The order of the sampled data is as follows. In the following introduced example, a sample with a numeral located left was created before a sample with a numeral located right was created. For example, a sample of K–1 is older than that of K. These sample data are transmitted in the order of left to right.

(original signal series 1) K–2, K–1, K, K+1, K+2, K+3, K+4, K+5, K+6, K+7, K+8, K+9

(original signal series 2) K–2, K–1, K, K+1, K+2, K+3, K+4, K+5, K+6, K+7, K+8, K+9

Of the two data series, i.e., the original signal series 1 and the original signal series 2 identical to each other, the original signal series 1 is delayed by four frame amount in the 4UT delaying means 30b. Therefore, when the series are supplied to the transmitting means 30d, the series are ordered as follow.

(N-ch signal series) K–6, K–5, K–4, K–3, K–2, K–1, K, K+1, K+2, K+3, K+4, K+5

(A-ch signal series) K–2, K–1, K, K+1, K+2, K+3, K+4, K+5, K+6, K+7, K+8, K+9

As is understood from the above example, the original signal series 1 is delayed with the result that the sample K–2 is replaced with a sample of K–6 in the corresponding position in the N-ch channel signal. The order of the above example corresponds to the arrangement of the sample data shown in FIG. 1(b). These sample data are received by way of a radio wave transmission path in this order. When these signal series are received by the receiving apparatus 31, the signal series transmitted on the A-ch channel is delayed to yield the following data series. As is understood from the following signal series, the signal series A-ch is delayed with the result that the sample K–2 is replaced with a sample of K–6.

(N-ch signal series) K–6, K–5, K–4, K–3, K–2, K–1, K, K+1, K+2, K+3, K+4, K+5

(A-ch signal series) K–6, K–5, K–4, K–3, K–2, K–1, K, K+1, K+2, K+3, K+4, K+5

In this way, according to the receiving apparatus 31 for use in a digital broadcasting apparatus, the signal data transmitted on the channel of A-ch (A1-ch, A2-ch, . . . , An-ch) are delayed by the 4UT delaying means 31c and outputted (this signal flow is represented by "b" noted before the selecting means 31d in FIG. 1(a)) while the signal data transmitted on the channel N-ch is not subjected to delaying and supplied to the selecting means 31d (this signal flow is represented by "a" noted before the selecting means 31d in FIG. 1(a)). In this way, the signal data on the channel N-ch and the signal data on the channel A-ch (A1-ch, A2-ch, . . . , An-ch) are made synchronous, with the result that the selecting means 31d can select the signal data on the channel N-ch in the normal receiving mode while select the signal data on the channel A-ch (A1-ch, A2-ch, . . . , An-ch) in a mode in which the signal data on the channel N-ch is not available.

As is clear from the above description, even if the signal data on the channel N-ch is delayed with respect to the signal data on the channel A-ch (A1-ch, A2-ch, . . . , An-ch), the signal data on the channel A-ch (A1-ch, A2-ch, . . . , An-ch) are delayed by the same time amount before they are supplied to the selecting means 31c. Therefore, the signal data on the channel N-ch and the signal data on the channel A-ch (A1-ch, A2-ch, . . . , An-ch) are supplied to the selecting means 31d in a synchronous fashion, which fact enables the selecting means 31d to select any from these signals and reproduce the same.

The broadcast employing the above-described time diversity system is carried out in the situation illustrated in FIG. 4. That is, when data of the channel N-ch and data of the channels A-ch (A1-ch, A2-ch, . . . , An-ch) are transmitted from the transmitting apparatus 30 for digital broadcast provided in the broadcasting station 50a by way of the parabolic antenna 50b to the broadcasting satellite 51, the broadcasting satellite 51 sends broadcasting radio wave by using an S-band. The radio wave sent from the broadcasting satellite 51 is transmitted through a radio propagation path to the receiving apparatus 31 for digital broadcast which may take a mode of a portable receiving terminal 52 or a terminal carried in a vehicle 53. In this case, the broadcast will be carried out by effectively utilizing the frequency band while taking the advantage of the time diversity system that investment in an expensive gap filler 54 or the like is minimized.

FIG. 2(b) is a diagram showing an arrangement of transmitting frames when the frames are transmitted in a primitive time diversity system, and also shows an arrangement of transmission sample frame data 62 deriving from the same data from which the samples shown in FIG. 1(b) are produced. However, unlike the time diversity system carried out with the data arrangement shown in FIG. 1(b), an ordinary time diversity system is employed for the data arrangement shown in FIG. 2(b) Now, the ordinary time diversity system will be described in order for comparison with the present invention. In the case shown in FIG. 2(b), both of the data signal of N-ch (frequency band of 768 Kbps) and the data signal of A-ch (frequency band of 768 Kbps) are made as a high quality data signal, and thus required frequency band therefor is 1536 Kbps in total. That is, the required frequency band in the case of FIG. 2(b) is wider than that in the case of FIG. 1(b), which proves that the time diversity system carried out with the arrangement having the information amount reducing means 30b is more advantageous in saving the frequency band when transmitting the signals.

Turning back to the case of FIG. 1(b), according to the broadcasting method with the time diversity system of the present invention, the high quality signal is transmitted on the channel of N-ch while the low quality signals are transmitted on the channels of A-ch (A1-ch, A2-ch, . . . , An-ch) of which transmission frequency band is narrower than that of the channel of N-ch. Thus, frequency band can be effectively utilized upon broadcasting signals using the time diversity system. If the signal to be transmitted is made to have a lower quality, then required frequency band is also reduced, with the result that the frequency band is more effectively utilized.

The term "quality" used in the "high quality signal" and the "low quality signal" means information amount contained in the signal to be transmitted, as described above. This means that, if data of 1536 Kbps in total is to be transmitted, twice the packet channels become necessary corresponding to the twice information amount.

Conversely, if the resolution of the signal is decreased to 8 bits, the signal information amount (bandwidth) becomes 384 Kbps. As described above, the low quality signal (including a plurality of low quality signals) has a frequency band smaller than the value. On the transmission side, the high quality signal is transmitted on the N-ch channel (first channel band) while the low quality signal is transmitted on the channels of A-ch (second channel band: A1-ch, A2-ch, ..., An-ch) of which bandwidth is narrower than that of the first channel band.

In this way, the method of transmitting, receiving and reproducing the signal in the digital broadcasting situation to which the present invention is applied is carried out using the the time diversity system. That is, according to the method of transmitting, receiving and reproducing the signal in the digital broadcasting situation, on the transmission side, the broadcast digital data is formed into a high quality signal, and at least one low quality signal is formed from the same broadcast digital data so that the quality is lower than that of the high quality signal. Then, the high quality signal and the low quality signal are transmitted so that each of the signal has a time lag relative to another. On the receiving side, if the normal receiving mode is brought about, the high quality signal is selected for reproduction to reproduce the broadcast program. If the broadcast hindrance mode is brought about, the low quality signal is selected for reproduction to recover the reproduction of the high quality signal.

The method of transmitting and receiving the signal in the digital broadcasting situation according to the another mode of the present invention will be described with reference to FIGS. 8 to 14.

Figure 8:
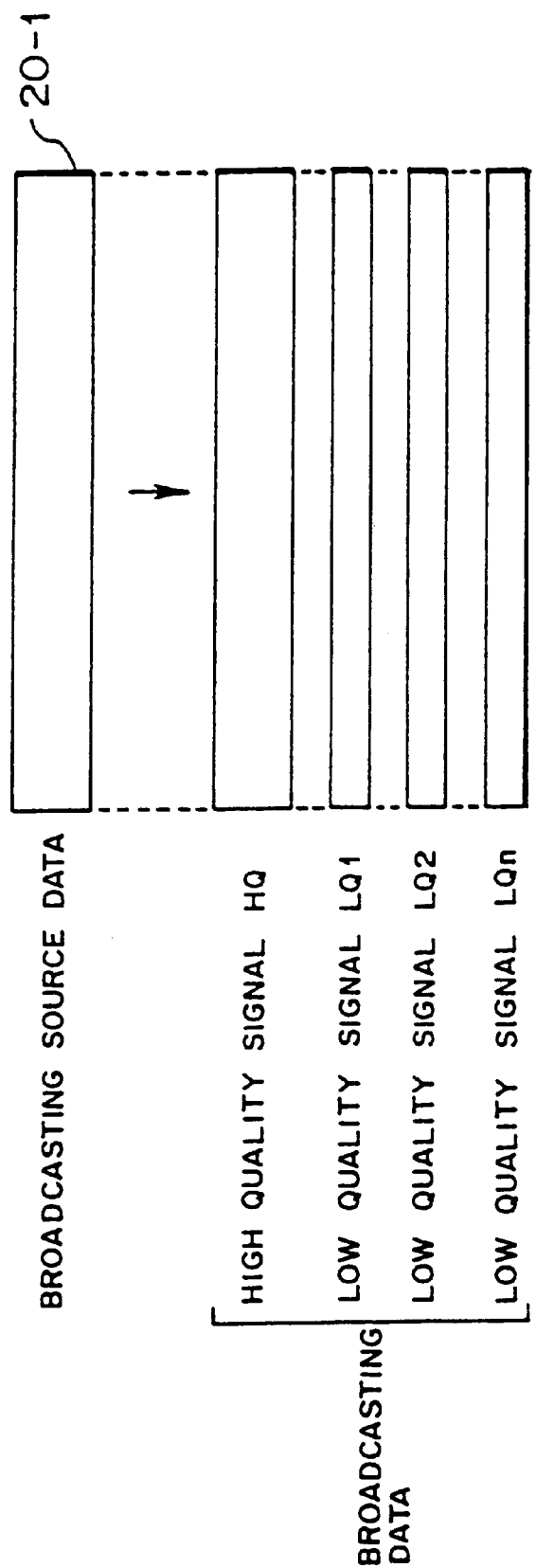
FIG. 8 is a diagram schematically showing how source data is developed into broadcast data.

FIG. 8 is a diagram schematically showing how source data is developed into broadcast data. The broadcast source data 20-1 shown in FIG. 8 is encoded to obtain a high quality signal HQ and low quality signals LQ1, LQ2, ..., LQn. The high quality signal HQ is allocated to the channel N-ch, the low quality signal LQ1 is allocated to the channel A1-ch, the low quality signal LQ2 is allocated to the channel A2-ch, ..., the low quality signal LQn is allocated to the channel An-ch, and these broadcast data are broadcast. The data amount of the low quality data LQ1, LQ2, ..., LQn is smaller than that of the high quality data HQ. Thus, the total frequency band occupied for transmitting these signals is made narrower.

That is, according to the method of transmitting, receiving and reproducing the signal in the digital broadcasting situation, on the transmitting side, the high quality signal is transmitted on the first channel band while a plurality of low quality signals are transmitted on the channels of which respective frequency bands are narrower than that of the first channel band.

In this case, the plurality of low quality signals are arranged to have a quality degraded gradually so that each of the frequency bands of the signals is different from one another. If the plurality of low quality signals are arranged as described above, these signals can be transmitted at a low transmission speed with regard to the number of channels. That is, on the transmitting side, the low quality signals are allocated to the channels An-ch in a descending order such that the highest quality broadcasting data among the low quality signals is allocated to the channel A1-ch, the second highest quality broadcasting data is allocated to the channel A2-ch, ..., the lowest among the low quality broadcasting data is allocated to the channel An-ch, and then transmitting data LQ1, LQ2, ..., LQn are broadcast in this order so that each of them has a time lag relative to another. When a trouble is caused on the receiving side, the reproducing means on the receiving side switches the high quality signal HQ to the low quality signal LQ1 for reproducing the broadcast program. If more serious trouble is caused for receiving the low quality signal LQ1, the reproducing means 19 on the receiving side switches from the low quality signal LQ1 to the low quality signal LQ2 for reproducing the broadcast program, thus selecting lower quality signal to LQ(n−1), LQn depending on the degree of seriousness of the receiving trouble. In this way, the trouble caused for receiving the signal for reproduction of the broadcast program is smoothly recovered by reproducing the next lower quality signal. If the receiving trouble is removed with the result that it becomes allowable to change from the current signal to the next higher quality signal for reproducing the program, operation will be carried out in the inverse manner.

Figure 9:
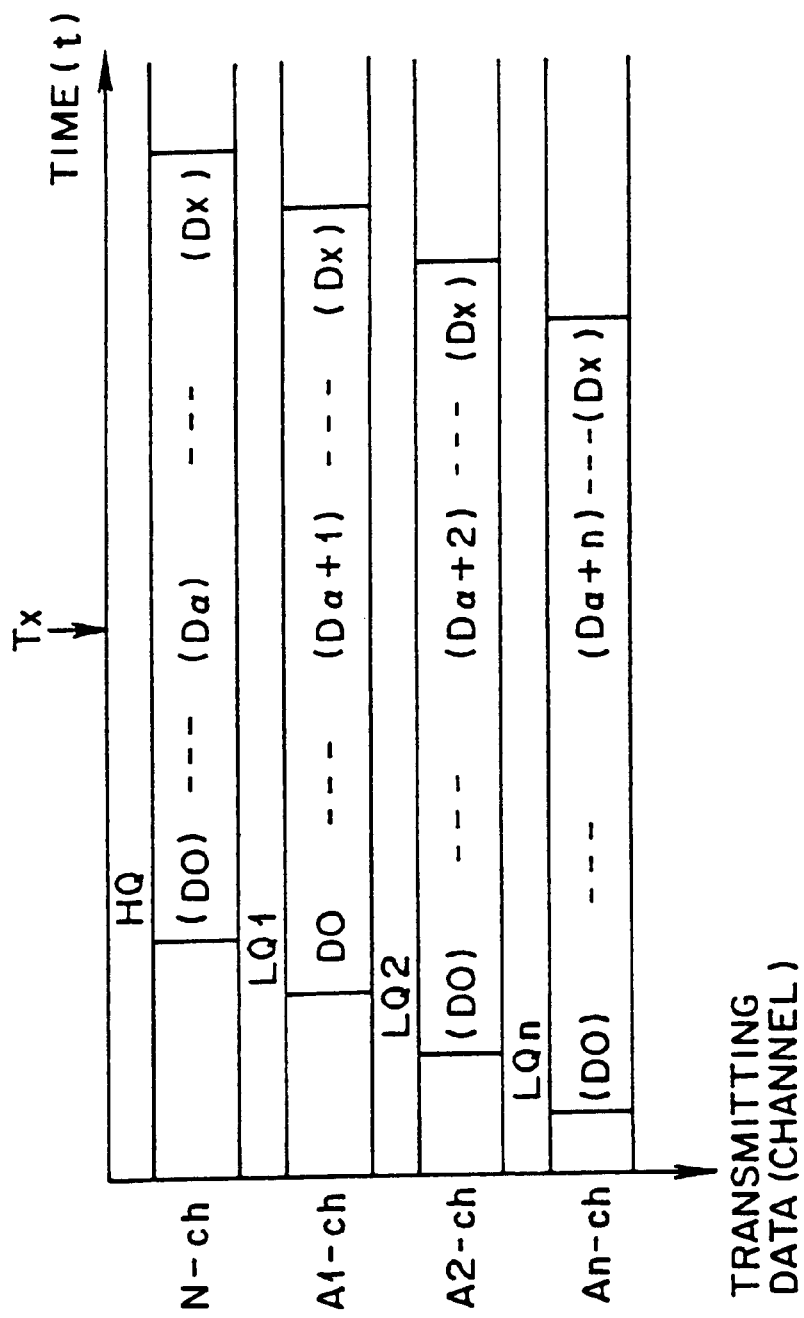
FIG. 9 is a diagram showing an arrangement of data converted into a transmission form.

FIG. 9 is a diagram showing an arrangement of data converted into a transmission form. In this diagram, the abscissa is taken as a time axis while the ordinate is taken as an indication of contents of data transmitted on the respective channels N-ch, A1-ch, ..., An-ch. For example, the high quality signal HQ to be transmitted on the channel N-ch contains data DO at the top thereof, data Dα at a timing point Tx, and data Dx at the tail thereof.

Now it is examined what kind of data is transmitted at a timing point Tx shown in FIG. 9. On the channel N-ch, data Dα is data to be transmitted. On the channel A1-ch, data Dα+1, which precedes by one unit time with respect to the data of the channel N-ch, is data to be transmitted. On the channel A2-ch, data Dα+2, which precedes by two unit time with respect to the data of the channel N-ch, is data to be transmitted. In a similar fashion, on the channel An-ch, data Dα+n, which precedes by n unit time with respect to the data of the channel N-ch, is data to be transmitted.

As described above, on the transmitting side, in addition to the high quality signal, a plurality of low quality signals each having different quality from another, are transmitted so that each of them has a time lag relative to another. Further, these low quality signals are transmitted before the high quality signal is transmitted. In order to perform the operation, the information amount reducing means 30c provided in the transmitting apparatus 30 for digital broadcast, is arranged to create a plurality of low quality signals differing in quality relative to another. The transmitting means 30d is arranged to transmit the low quality signals together with the high quality signal so that each of the signals has a time lag relative to another. Further, the transmitting means 30d is arranged to transmit the low quality signals before transmitting the high quality signal. Furthermore, the transmitting means 30d transmits the high quality signal on the channel N-ch (first channel band) and the low quality signals on the group of channels A1-ch, ..., An ch (second channel band) of which bandwidth is narrower than that of the first channel band. In addition, each of the channel bands for the plurality of low quality signals is arranged to be narrower than the first channel band. Each of the channel bands for the plurality of low quality signals is made different from one another, and the quality of the signals is decreased step by step from one signal to another so that a lower quality signal can be transmitted at a narrower frequency band.

Since the set of signals is arranged as described above, a small frequency band is required for to be transmitting the signals as compared with when the same number of signals have the same frequency band are to be transmitted, and hence the frequency band of radio waves effectively utilized.

Figure 10:
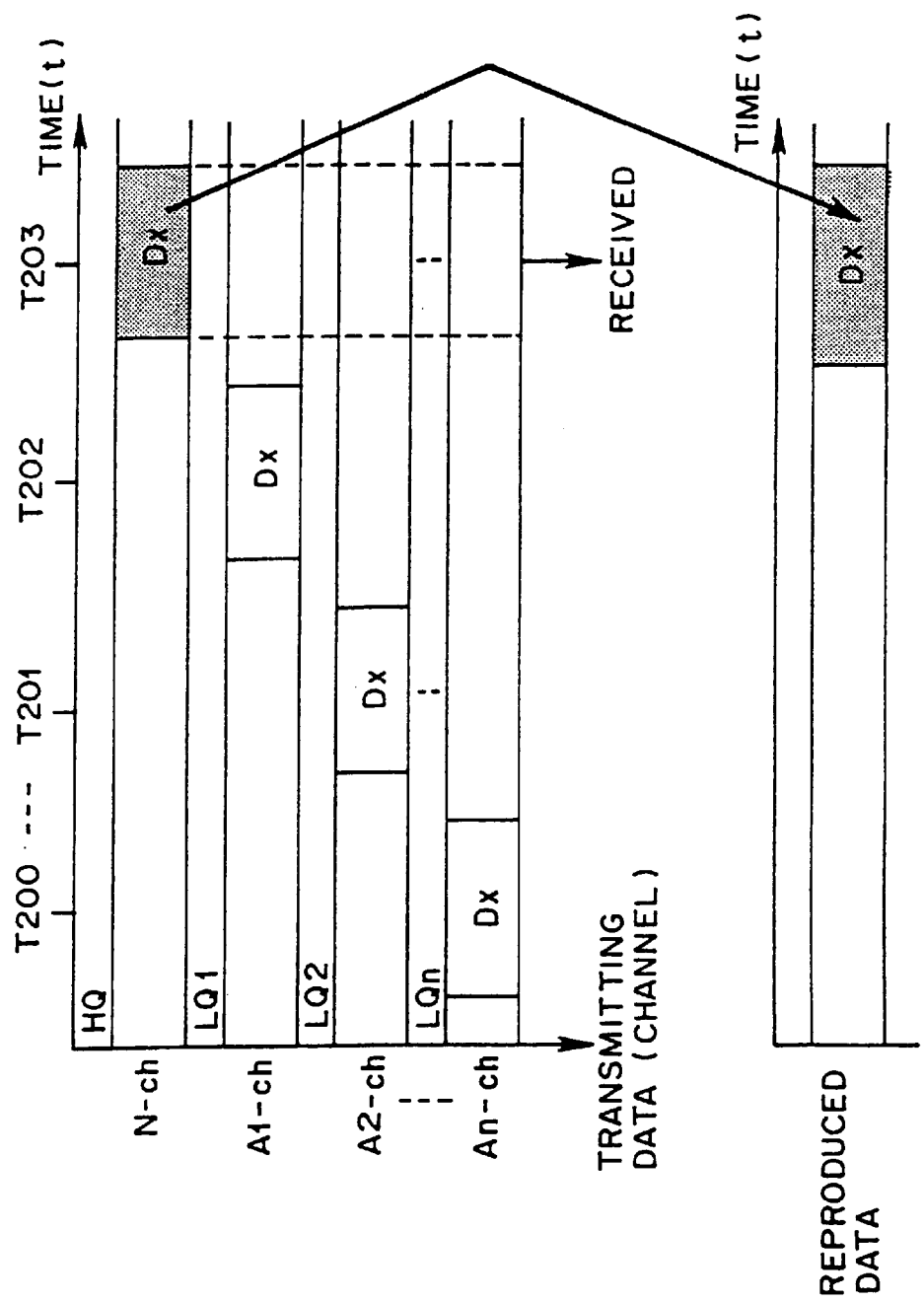
FIG. 10 is a diagram useful for explaining how the plurality of signals are selected for reproduction upon the normal mode.

FIG. 10 is a diagram useful for explaining how the plurality of signals are selected for reproduction upon the normal receiving mode. As shown in FIG. 10, a plurality of pieces of data Dx having an identical contents are transmitted with a time lag relative to one another from the transmitting side. That is, the data Dx having the same contents has been sent a plurality of times at timing points preceding a timing point of T203 at which the high quality signal HQ is transmitted on the channel N-ch. With regard to the data Dx, the receiving side selects the high quality signal for reproduction.

According to the above method, plurality of pieces of the data of the same contents Dx shall be held in a memory (not shown) provided in the receiving apparatus 31 until one of the pieces is selected for reproduction. According to the method of the present invention, in order to reduce the task imposed on the memory of the receiving apparatus 31, it is desirable to shorten the time interval between a timing point when one data piece is transmitted and the next timing point when the same data piece is transmitted based on the time diversity system. That is, if the time interval is large, the memory is required to store therein a large amount of data, correspondingly. Moreover, the efficiency of the memory utilization will be improved upon the time diversity system of the present invention as compared with when the ordinary time diversity system is employed. That is, according to the time diversity system of the present embodiment, since the plurality of signals for supporting the data transmission with the high quality signal are made to have a low quality as compared with the high quality signal. Therefore, the memory is required to store a smaller amount of data as compared with when the plurality of signals for supporting the data transmission are made to have the same high quality for the same data contents. Thus, the memory is more efficiently utilized. In this case, if the time interval between a timing point when one data piece is transmitted and the next timing point when the same data piece is transmitted, is too short, then the data pieces neighboring each other can encounter the same burst error on the transmission path, with the result that one data piece transmission cannot recover another data piece transmission when the another data piece is failed to be received. In order to avoid such incidence, the time interval shall be determined on the circuit design under consideration of the transmission environment.

Figures 11A, 11B, 11C:
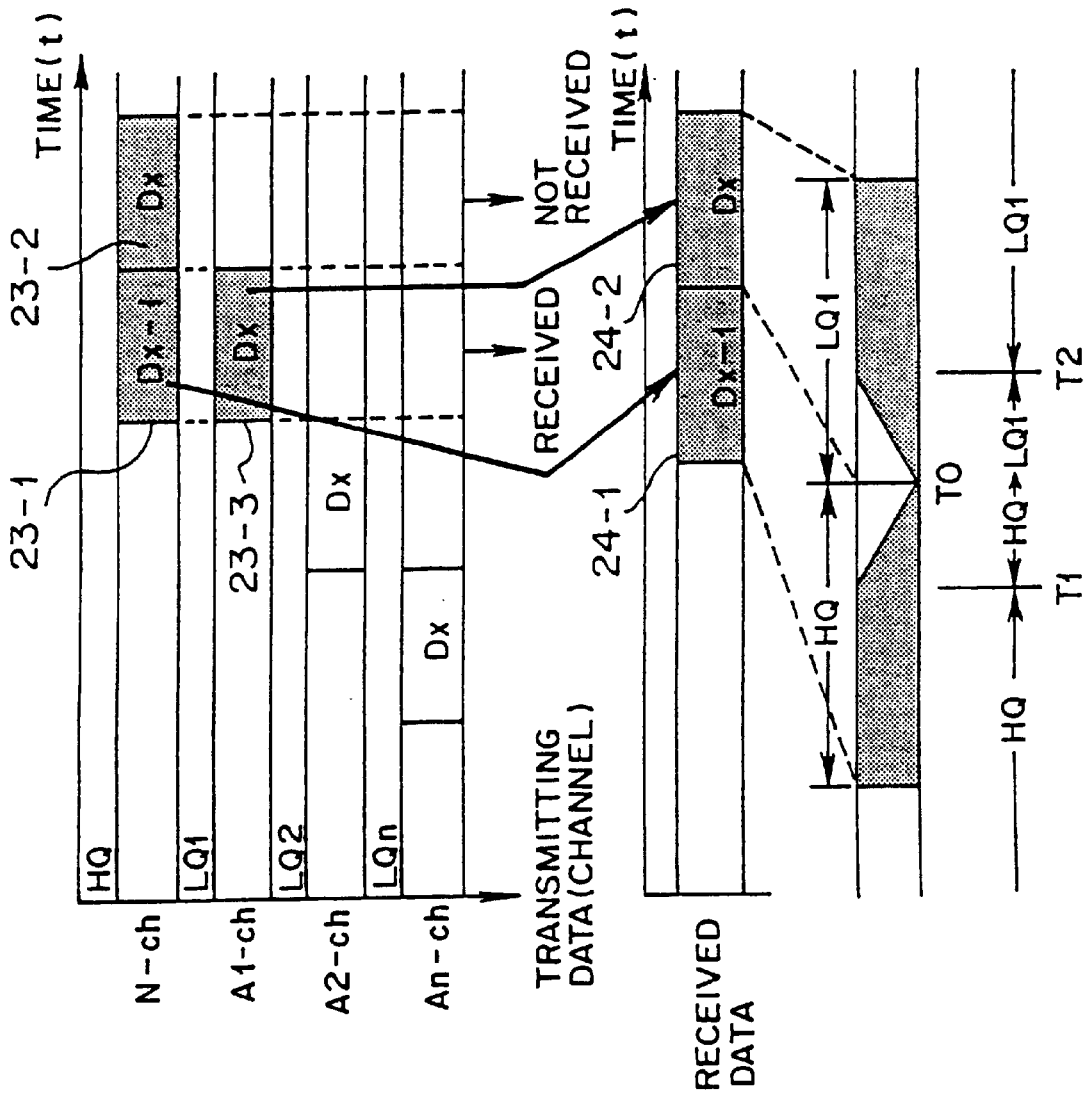
FIG. 11(a) is a diagram showing an arrangement of transmitting data.
FIG. 11(b) is a diagram showing an arrangement of received data selected for reproduction when a broadcast hindrance mode is brought about.
FIG. 11(c) is a diagram showing an arrangement of reproducing data having been subjected to a smoothing processing.

FIGS. 11(a) to 11(c) are diagrams useful for explaining a data selecting method when one low quality signal is utilized for recovering the reproduction of the high quality signal in response to occurrence of the broadcast hindrance mode. As shown in FIG. 11(a) data contents Dx-1 (attached with reference numeral 23-1) and data contents Dx (attached with reference numeral 23-2) are transmitted on the channel N-ch from the transmitting side. Further, the data contents Dx (attached with reference numeral 23-3) is also transmitted on the channel A1-ch.

As shown in FIG. 11(b), if the high quality signal has been successfully received till the timing point T0 but trouble in receiving the signal is brought about at the timing point T0 on the channel N-ch, with the result that the signal on the channel N-ch becomes incapable of being received, then the mode determining means 31b provided in the receiving apparatus (receiving apparatus 31 for digital broadcast) issues a signal to the selecting means 31d so that the selecting means 31d changes from the channel N-ch to the channel A1-ch. Thus, the signal LQ1 transmitted on the channel A1-ch is reproduced to continue the broadcast reproduction. If the signal LQ2, . . . , or LQn is selected, the selected signal is reproduced for continuing the broadcast reproduction. That is, the data contents Dx-1 is selected from the high quality signal HQ and placed in a frame attached with the reference numeral 24-1 while the data contents Dx is selected from the low quality signal LQ1 and placed in a frame attached with the reference numeral 24-2.

If signal change is simply carried out from the high quality signal HQ on the channel N-ch to the low quality signal LQ1 on the channel A1-ch (the low quality signal LQ2 on the channel A2-ch, . . . , the low quality signal LQn on the channel An-ch are selected), abrupt change will occur in the reproduced signal quality, resulting in generation of switching noise. As a countermeasure against the noise generation, a smoothing processing will be effected before and after the switched portion. There are some possible smoothing processings. If data of the high quality signal HQ and low quality signal LQ are successfully received at a frame soon before the frame at which signal change is brought about, as shown in FIG. 11(a), so called cross-fade method can be employed. That is, the high quality signal data is weighted with a gradually decreasing weight coefficient (fade-out) while the low quality signal data is weighted with a gradually increasing weight coefficient (fade-in), and both of the data are overlaid on each other. If corresponding volume is small at the place where the signal selection is changed, then a smoothing as shown in FIG. 11(c) may be carried out. In this case, T2 represents a timing point at which reproduction is started for the LQ1 signal, T1 a timing point preceding to the timing point T2 by a predetermined time duration, and T0 is taken as a switching timing. That is, the receiving apparatus 31 selects the high quality signal HQ for reproduction till the timing point T1. In the time interval between the timing points T1 and T2, the receiving apparatus reproduces both of the high quality signal HQ and the low quality signal LQ1 so that smoothing is effected between the data Dx and Dx-1 and quality is gradually changed to make noise inconspicuous. From the timing point T2, the reproducing apparatus selects only the low quality signal LQ1 (or LQ2, . . . , LQn) for reproduction. The smoothing processing effected between the timing points T1 and T2 may be carried out as an averaging processing with weighting or the like in such a manner that, between the timing points T1 and T0, a weighting function of which value gradually decreases to zero is applied to the data (fade-out) while between the timing points T0 and T2, a weighting function of which value gradually increases from zero is applied to the data (fade-in). When the neighboring data is brought close to each other to form continuous data, portions of data having a high correlation therebetween (having a high similarity) may be selected for the connecting point. Further, when a signal for reproduction is switched between the high quality signal HQ and the low quality signal LQ, data for interpolation and synthesis may be created from data of the high quality signal HQ and the low quality signal LQ having been received so far and having been subjected to the decoding processing.

In this way, on the receiving side, when transition is made from the normal receiving mode to the broadcast hindrance mode, the high quality signal and the low quality signal are processed and reproduced so that continuous change is effected in terms of quality from the high quality signal to the low quality signal. Therefore, when the reproduced quality is changed upon the switching, it is possible to suppress the noise generation due to an abrupt change in the reproduced quality, with the result that the reproduced sound quality is highly maintained.

Moreover, since the transmitting side and the receiving side contribute the transmission and the reception in a manner as described above, digital broadcast data can be received by a simply arranged apparatus. Therefore, the frequency band required for transmission becomes narrow, a number of programs to be broadcast can be increased, and the system management cost per program can be made inexpensive. Further, even if the radio wave is cut due to any trouble on the receiving side, the reproduction on the broadcast program can be recovered and continued, with the result that a listener of the program can enjoy the broadcast program without uncomfortable feeling.

In this way, on the receiving side, when transition is made from the broadcast hindrance mode to the normal receiving mode, the high quality signal and the low quality signal are processed and reproduced so that continuous change is effected in terms of quality from the low quality signal to the high quality signal.

That is, according to the reproducing apparatus 31 for digital broadcast, the mode determining means 31b is arranged to detect the transition from the normal receiving mode to the broadcast hindrance mode. When the mode determining means 31b detects the transition from the normal receiving mode to the broadcast hindrance mode, the reproducing means 31e processes and reproduces the high quality signal and the low quality signal so that continuous change is effected in terms of quality from the high quality signal to the low quality signal. Also, the mode determining means 31b is arranged to detect the transition from the broadcast hindrance mode to the normal receiving mode. When the mode determining means 31b detects the transition from the broadcast hindrance mode to the normal receiving mode, the reproducing means 31e processes and reproduces the high quality signal and the low quality signal so that continuous change is effected in terms of quality from the low quality signal to the high quality signal.

According to the above arrangement, a number of programs allowable to simultaneously broadcast can be increased, and cost for system management per unit program can be reduced. In addition, since the frequency band for broadcasting can be effectively utilized, it is possible to take the advantage of system of time diversity that investment in providing gap filler 54 or the like can be minimized while broadcasting can be carried out.

Figures 12A, 12B, 12C:
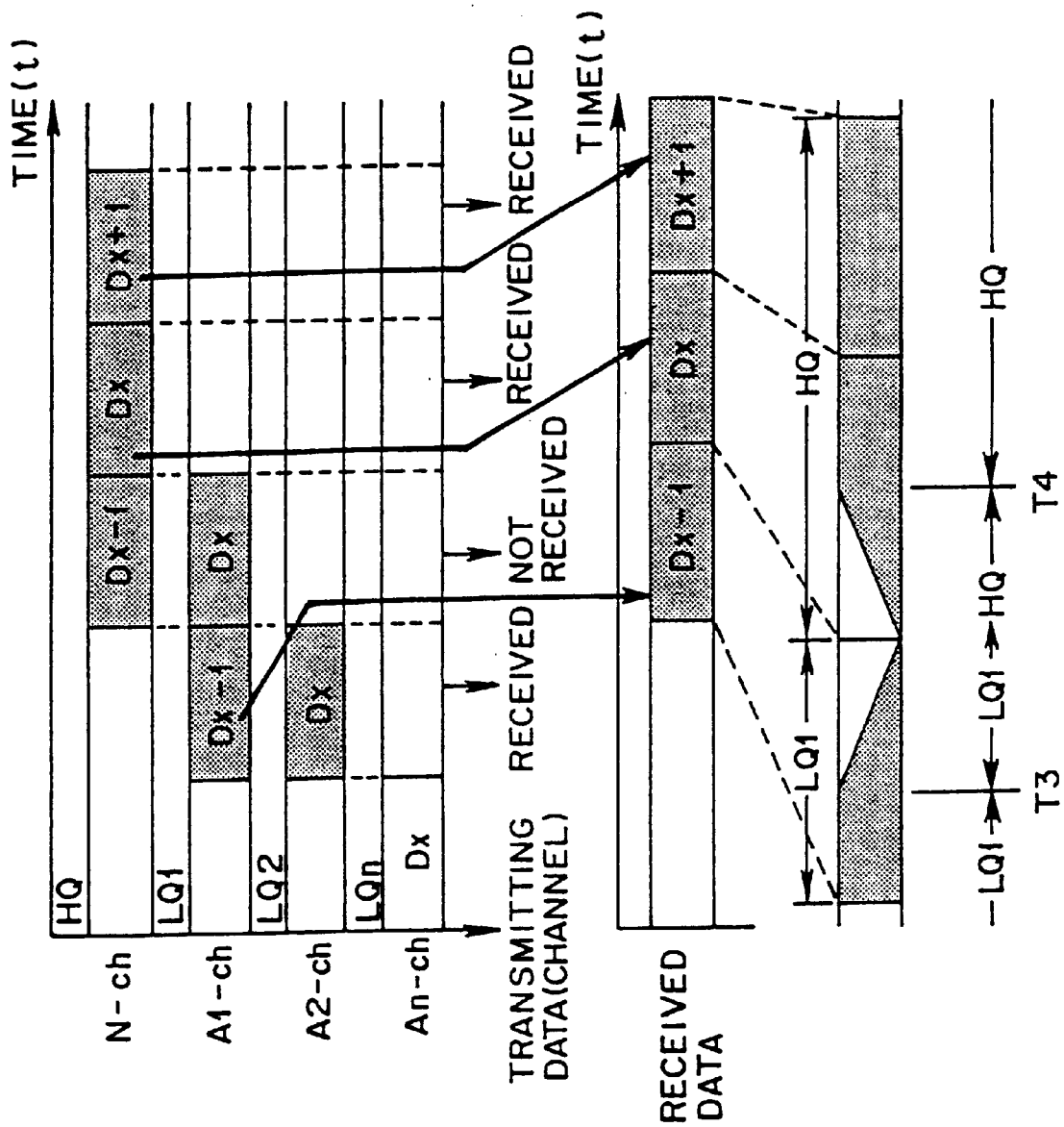
FIG. 12(a) is a diagram showing an arrangement of transmitting data.
FIG. 12(b) is a diagram showing an arrangement of received data selected for reproduction when transition from the broadcast hindrance mode to the normal receiving mode is brought about.

FIGS. 12(a) to 12(c) are diagrams useful for explaining selection of data for reproduction when the normal receiving mode is restored from the broadcast hindrance mode. The situation illustrated in FIGS. 12(a) to 12(c) is that the signal on the channel A1-ch is selected for reproduction because the broadcast hindrance mode is brought about in the receiving apparatus but the receiving environment is improved at a timing point, allowing the selection of the high quality signal HQ for reproduction and the changing to the channel N-ch. When data is transmitted as illustrated in FIG. 12(a), the receiving side shall receive the transmitted data in an order of Dx−1, Dx, Dx+1. Now, it is supposed that data LQ1 having the data contents Dx−1 on the channel A1-ch is selected for reproduction under the broadcast hindrance mode. If the receiving environment is improved to allow the selection of the high quality signal HQ for reproduction, the selected channel is changed from the channel A1-ch to the channel N-ch to select data Dx. Thereafter, data Dx+1 is selected from the high quality signal HQ for reproduction.

As a measure against generation of switching noise, a smoothing processing may be carried out before and after the portion where the switching takes place. Since the high quality signal HQ has been successfully received at a frame containing the data Dx soon after the switching portion, data corresponding to the LQ1 can be created from the HQ data. The two pieces of data connected to each other may be subjected to a smoothing processing such as a cross-fade method. That is, data on the side of LQ1 is subjected to a fade-out processing while data on the side of HQ is subjected to a fade-in processing, thereafter both of the data are overlaid on each other.

When a volume corresponding to the switching portion of the signal is small, the smoothing processing may be carried out as illustrated in FIG. 12(c). If T3 is taken as a timing point when the high quality signal HQ is allowed to be selected for reproduction, and T4 is taken as a timing point when a predetermined time has elapsed after the timing point T3, then the low quality signal LQ1 is selected for reproduction until the timing point T3 and the high quality signal HQ is selected for reproduction from the timing point T4. In the time interval between the timing points T3 and T4, smoothing is effected on the data contents Dx−1 and the data contents Dx so that transition is gradually brought about in terms of quality from the low quality signal LQ1 to the high quality signal HQ without generating noise.

According to the switching method as described above, if the high quality signal HQ comes to be successfully received and it becomes allowable to reproduce the high quality signal HQ on the receiving side, switching is instantly effected from the low quality signal to the high quality signal. Therefore, if the receiving environment is unstable, frequent switching between the modes will occur, leading to an inverse effect that the switching noise becomes conspicuous. One of possible countermeasure against the problem is that the switching from the low quality signal to the high quality signal may be prevented from being brought about until several number of high quality signal frames, e.g., ten frames are successfully received continuously. That is, the mode determining means 31b is arranged not to determine it is allowable to change to the normal receiving mode until a predetermined number of high quality signal frames are successfully received continuously. Further, if the mode determining means 31b determines it is allowable to change to the normal receiving mode, then the reproducing means 31e selects the high quality signal for reproduction. That is, after the broadcast hindrance mode is effected on the receiving side, a fact that the high quality signal has been continuously received for a predetermined number of frames, leads to a transition to the normal receiving mode in which the high quality signal is selected for reproduction.

Figure 13:
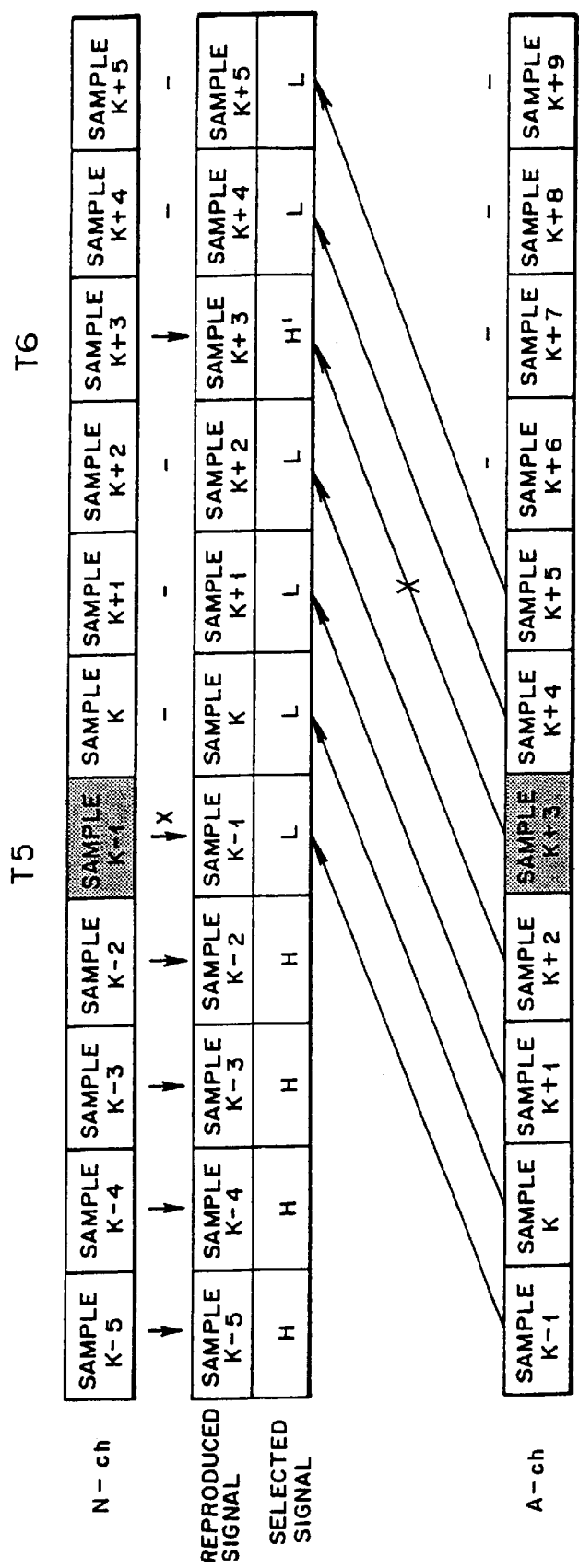
FIG. 13 is a diagram useful for explaining how data for reproduction is selected when low quality data is created from a high quality signal.

FIG. 13 is a diagram useful for explaining how data for reproduction is selected when low quality data is created from a high quality signal, and is a diagram for explaining another method of selecting data for reproduction in which even if it is detected that the high quality signal is successfully received under the condition that the broadcast hindrance mode is effected, the transition is not effected from the broadcast hindrance mode to the normal receiving mode. The situation illustrated in FIG. 13 is as follows. That is, the receiving apparatus 31 is brought into the broadcast hindrance mode due to a trouble in receiving process and the low quality signal on the channel A1-ch is selected for reproduction. Under this condition, it is detected that the high quality signal is successfully received owing to improvement in receiving environment but the time duration thereof does not reach the predetermined number of frames amount, and hence the low quality signal receiving mode still continues. But the low quality signal is failed to be received.

According to one mode of the present invention, if the above-described situation is brought about, data is created in a low quality fashion from the high quality signal to recover the reproduction of the low quality signal. This operation is carried out by the information amount reducing means 38e described with reference to FIG. 3. That is, on the receiving side, the low quality signal is not successfully received but the high quality signal is successfully received under the broadcast hindrance mode, data is created in a low quality fashion from the high quality signal to recover the reproduction of the low quality signal. In order to accomplish the operation, the reproducing means 38f is arranged to create a low quality signal by using the high quality signal and reproduces the low quality signal when the low quality signal is not successfully received but the high quality signal is successfully received under the broadcast hindrance mode.

The selecting means 38d provided in the receiving apparatus 38 for digital broadcast shown in FIG. 3 is operated as follows. That is, the high quality signal has been successfully received before the timing point T6. If frame data corresponding to the sample K−1 is failed to be received from the high quality signal, the selecting means 38d switches the channel N-ch, which has been selected for reproduction so far, to the channel A1-ch, and starts counting the frame number received on the channel N-ch. If it is happened that a piece of data (sample K+3) is failed to be received on the switched channel A-ch (A1-ch, . . . , An-ch) at a timing point T6 when continuous ten frames successfully received have not been counted yet on the channel N-ch, then data is created in a low quality fashion from the high quality data received on the channel N-ch. The column of selected signal is provided in FIG. 13 for indicating which of the high quality signal HQ and the low quality signal LQ is selected for reproduction at each frame. According to the indication in this column, it is understood that a symbol H (High) is entered before the timing point T5 and the high quality signal is selected for reproduction. On the other hand, a symbol L (low) is entered from the timing point T5 and the selected signal is changed to the low quality signal LQ. However, a symbol H' is entered at the timing point T6, which means that the receiving apparatus fails to receive data on the channel A1-ch, the receiving apparatus 31 creates data in a low quality fashion from the high quality signal HQ and reproduces the created data.

In this way, broadcast data can be transmitted and received at a satisfactory quality level from practical viewpoint by a simple arrangement, with the result that a number of programs simultaneously broadcast can be increased, and cost for system management per unit program can be reduced. In addition, since the frequency band for broadcasting can be effectively utilized, it is possible to take the advantage of system of time diversity that investment in providing gap filler 54 or the like can be minimized while broadcasting can be carried out.

Figures 14A, 14B, 14C:
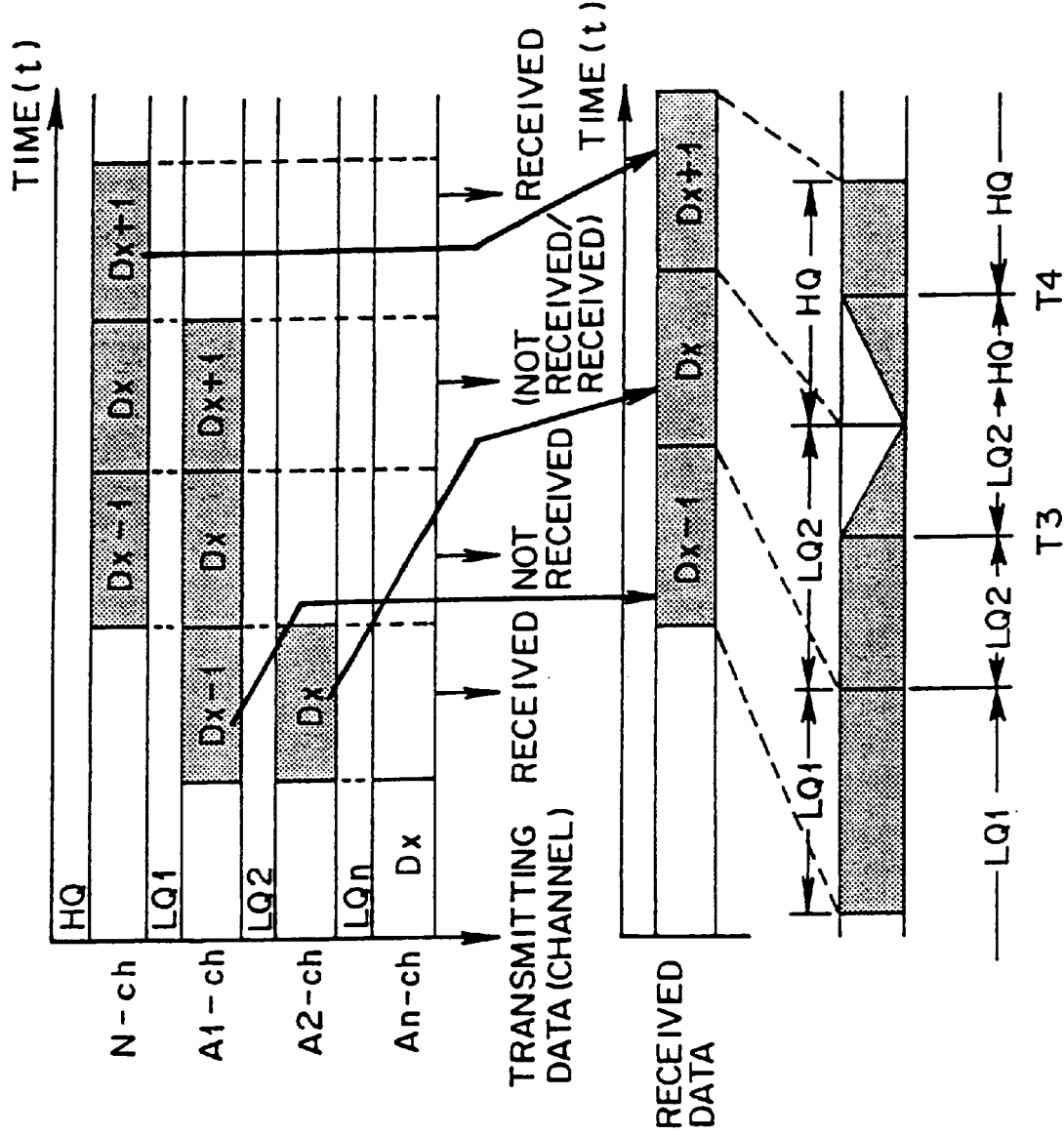
FIG. 14(a) is a diagram showing an arrangement of transmitting data.
FIG. 14(b) is a diagram showing an arrangement of received data selected for reproduction when further recovery of another low quality signal is required under the broadcast hindrance mode.
FIG. 14(c) is a diagram showing an arrangement of reproducing data having been subjected to a smoothing processing.

FIGS. 14(a) to 14(c) are diagrams useful for explaining another method of selecting data for reproduction in which further recovery of another low quality signal is required under the broadcast hindrance mode. According to the method illustrated in FIGS. 14(a) to 14(c), if the low quality signal LQ1 is not available, a low quality signal LQ2 having a lower quality than the low quality signal LQ1 is selected for reproduction. The situation illustrated in FIGS. 14 (a) to 14(c) is brought about when the receiving apparatus 31 selects the channel A1-ch for reproduction due to a trouble in receiving a signal, and the low quality signal is failed to be received on the channel A1-ch under the condition that the high quality signal HQ is still not continuously received.

That is, data illustrated in FIG. 14(a) is transmitted and data Dx−1 is selected on the channel A1-ch for reproduction as shown in FIG. 14(b) and reproduced. But the next data Dx is received neither on the channel A1-ch nor on the channel N-ch on which the high quality signal HQ is supplied. Thus, the selected channel is switched from the channel A1-ch to the channel A2-ch on which the low quality signal LQ2 having a lower quality than the low quality signal LQ1 is supplied. Then, the low quality signal LQ2 is reproduced.

FIG. 14 (c) is a diagram showing an arrangement of reproducing data having been subjected to a smoothing processing, and FIG. 14(c) shows a reproduced frame array containing two kinds of switching portions. That is, there are portions of a data switching from the low quality signal LQ1 to the low quality signal LQ2 brought about before a timing point T3 and a data switching from the low quality signal LQ2 to the high quality signal HQ brought about after a timing point T3. Of the switching portions, when the switching from the low quality signal LQ1 to the low quality signal LQ2 is brought about, both of the data pieces are placed close to each other without smoothing processing. However, the receiving apparatus may be arranged to carry out smoothing processing upon connecting the data pieces to each other. Further, the manner for carrying out the smoothing processing may be the cross-face method or the like described with reference to FIG. 11. Although not illustrated in the figure, when switching is effected from the high quality signal HQ to the low quality signal LQ1, the above-described cross-face method or the like may be employed.

Further, when switching is effected from the low quality signal LQ2 to the high quality signal HQ between the timing points T3 and T4, smoothing similar to that described with reference to FIG. 12 may be carried out. The receiving apparatus may be arranged to carry out smoothing on the portion between the data Dx and Dx+1 so that change from the low quality signal LQ2 to the high quality signal HQ is gradually carried out in terms of quality so as to suppress the switching noise caused from the switching operation.

According to the above embodiment of the present invention, if the high quality signal is not successfully received, the low quality signal is selected for reproduction. Further, if the low quality signal is still not received successfully under worse condition, a lower quality signal is selected for reproduction, whereby continuous reproduction is supported. Therefore, a receiving trouble due to a multipath fading or the like can be decreased and a unit for receiving the radio wave within the receiving apparatus can be arranged in a simple manner.

Moreover, broadcast data can be transmitted and received at a satisfactory quality level from practical viewpoint by a simple arrangement, with the result that a number of programs simultaneously broadcast can be increased, and cost for system management per unit program can be reduced.

Incidentally, a function for creating data in a low quality fashion from the high quality signal HQ can be implemented in a manner different from the manner described above. That is, according to the above described manner, the high quality signal HQ and the group of the low quality signals LQ1, LQ2, . . . , LQn are created in the broadcasting station 50a and these signals are allocated to respective channels also in the broadcasting station 50a. Thus, the high quality signal HQ and the group of the low quality signals LQ1, LQ2, . . . , LQn are multiplexed in the broadcasting station 50a and transmitted therefrom to the broadcasting satellite 51. However, the creation of the signals may be carried out in a different manner. That is, only the high quality signal HQ is created from the broadcasting station 50a and transmitted therefrom to the broadcasting satellite 51 in a wireless fashion. When the broadcasting satellite 51 receives the high quality signal HQ, the group of the low quality signals LQ1, LQ2, . . . , LQn are created in the broadcasting satellite 51, and these signals are multiplexed in the broadcasting satellite 51 and again transmitted therefrom as a broadcasting radio wave.

Figure 15:
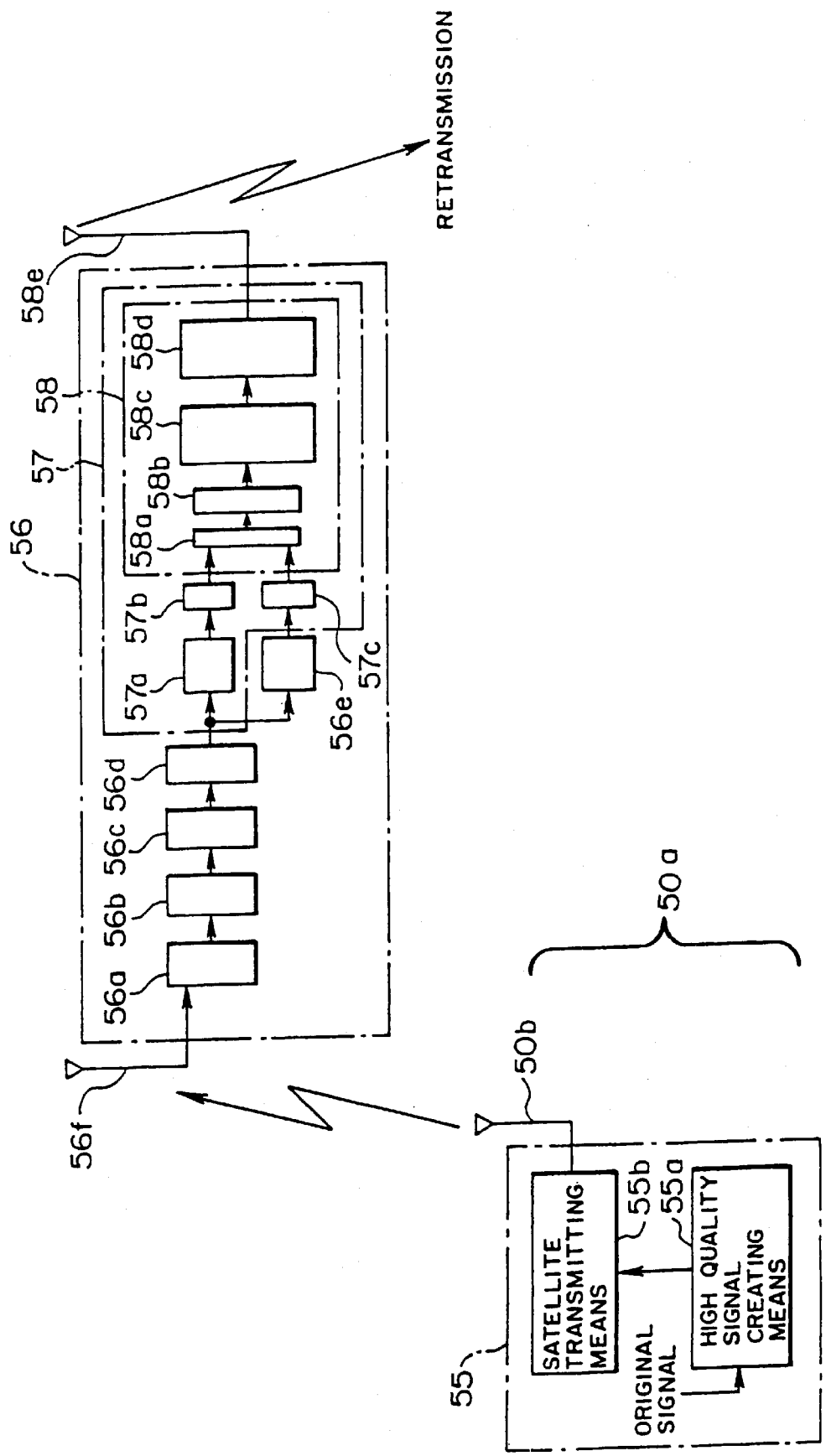
FIG. 15 is a diagram showing an arrangement of a system in which the high quality signal creating means is provided in a broadcasting station and the low quality signal creating means and the transmitting means are provided in a broadcasting/communication satellite.

The mode of the embodiment in which the above variation is implemented is illustrated in FIG. 15. As shown in FIG. 15, a transmitting apparatus 55 for digital broadcast provided in the broadcasting station 50a on the ground creates only the high quality signal HQ and transmits the same with a radio wave to a broadcasting (communication) satellite 56 (a process of up-link is carried out). The broadcasting satellite 56 is arranged to have the multiplexing function on the high quality signal HQ and the group of the low quality signals LQ1, LQ2, . . . , LQn. The broadcasting satellite 56 receives the high quality signal HQ, frequency-converts the same and thereafter, creates the group of the low quality signals LQ from the high quality signal HQ. Then, the broadcasting satellite 56 multiplexes these signals and again transmits the same to the ground.

That is, as shown in FIG. 15, the transmitting apparatus 55 for digital broadcast provided in the broadcasting station 50a is arranged to include high quality signal creating means 55a for creating a high quality signal from an original signal, and satellite transmitting means 55b for transmitting a data signal created by the high quality signal creating means 55a to the broadcasting satellite 56. When a coded modulated signal is sent from the transmitting apparatus 55 for digital broadcast in a unit of frame, the broadcasting satellite 56 receives the signal by an antenna 56f. The received signal is down-converted by frequency converting means 56a provided in the broadcasting satellite 56, the down-converted signal down-converted by the frequency converting means 56a is demodulated by demodulating means 56b. A signal generated from the demodulating means 56b is subjected to error correction in error correcting means 56c. A signal having been subjected to the error correction in the error correcting means 56c is partitioned in a unit of frame by separating means 56d and demultiplexed into a signal on the channel N-ch and a plurality of signals on channels A-ch (A1-ch, A2-ch, . . . , An-ch).

The digital data is delayed by, for example, four frame amount in delaying means 57a. On the other hand, the same digital data is supplied to low quality signal creating means 56e in which a plurality low quality signals having a lower quality than the high quality signal are created from the same digital data. The high quality signal delayed by the delaying means 57a is compressed by encoding means 57b. Also, low quality signal data generated from the low quality signal creating means 56e are compressed by encoding means 57c. The data generated from the encoding means 57b and 57c are multiplexed by a multiplexer 58a. The multiplexed data generated from the multiplexer 58a is supplied to error correction code inserting means 58b in which the multiplexed data signal is subjected to a coding processing so as to be made tough against communication error. The data generated from the error correction code inserting means 58b is supplied to modulating means 58c in which the signal is modulated. The modulated signal generated from the modulating means 58c is up-converted and amplified for transmission by frequency conversion amplifying means 58d. Then, the modulated signal is again sent from an antenna 58e in a radio wave fashion to the ground.

That is, the high quality signal creating means 55a is provided in the broadcasting station 50a while the low quality signal creating means 56e and the transmitting means 57 are provided in the broadcasting satellite 56.

According to the above arrangement, the system can be managed with a flexibility. Therefore, if specification change is requested upon constructing the communication system, it is possible to respond to the request with ease and management cost thereof an be reduced.

(B) Other Disclosure

The present invention is not limited to the above embodiments but various changes and modifications can be effected without departing from the scope of the present invention.

For example, the radio transmission system is varied, the present invention can be also applied. For example, if the scheme of modulation, scheme of error correction, a frequency band for transmission are changed, the present invention can be also applied. Further, the delaying time amount counted based on number of frames is not limited to four frames but various number of frames may be employed depending on the property of the transmission path. According to the above-described embodiments, a plurality of signals are multiplexed upon transmission. However, each of the plurality of signals on the channels of N-ch, A-ch (A1-ch, . . . , An-ch) may be allocated with a different carrier frequency band and the signals may be transmitted in a parallel fashion. If such arrangement is employed, the manner of diversity necessarily employs a plurality of frequency bands. In this situation, similarly to the above embodiments, a low quality signal may be created in addition to the high quality signal to recover the reproduction of the high quality signal.

While in the above embodiments the high quality signal HQ and the low quality signals LQ1 (LQ2, . . . , LQn) are subjected to the same encoding system for data allocation at a different bit rate, the high quality signal HQ and the low quality signals LQ1 (LQ2, . . . , LQn) may be subjected to the same encoding system for data allocation at a different sampling frequency. For example, if the sampling frequency is changed from 44 kHz to 32 kHz to change the data transmission speed, the present invention is also applicable. Further, if image data is broadcast, full image data may be allocated to the high quality signal channel while differential data or intermediate data for progressive reproduction may be allocated to the low quality signal channel.

What is claimed is:

1. A method of transmitting a signal from a transmitting side and receiving and reproducing the transmitted signal on a receiving side in a digital broadcasting situation, the method carried out in such a manner that:

on the transmitting side, a high quality signal is created based on broadcast digital data and at least one low quality signal is created based on the same broadcast digital data, the low quality signal being created by reducing an information data amount of the high quality signal, so that the quality of the low quality signal is low with respect to that of the high quality signal, and the high-quality signal and the low quality signal are transmitted so that one of the signals has a time lag relative to the other, the high quality signal is transmitted by using a first channel band while the low quality signal is transmitted by using a second channel band of which width is narrower than that of the first channel band, the low quality signal being transmitted before the high quality signal is transmitted from the transmitting side, and on the receiving side, the receiving side including mode determining means for determining which of a normal receiving mode and a broadcast hindrance mode is effected, and reproducing means for reproducing the high quality signal when the normal receiving mode is effected while reproducing the low quality signal when the broadcast hindrance mode is effected, the reproducing means reproduces the high quality signal when the mode determining means determines a normal receiving mode is effected while the reproducing means reproduces the low quality signal when the mode determining means determines the broadcast hindrance mode is effected.

2. A method according to claim 1, wherein on the transmitting side a plurality of low quality signals different in quality from one another are prepared as the low quality signal, and the high quality signal and the plurality of low quality signals are transmitted so that each of the signals has a time lag relative to another.

3. A method according to claim 1, wherein the high quality signal is transmitted by using a first channel band while each of the low quality signals is transmitted by using a second channel band of which each width of the low quality signals is narrower than that of the first channel band.

4. A method according to claim 3, wherein each of the second channel bands is different from one another.

5. A method according to claim 1, wherein when transition is brought about from the normal receiving mode to the broadcast hindrance mode on the receiving side, the high quality signal and the low quality signal are processed and reproduced so that continuous change is effected in terms of quality from the high quality signal to the low quality signal.

6. A method according to claim 1, wherein when transition is brought about from the broadcast hindrance mode to the normal receiving mode on the receiving side, the high quality signal and the low quality signal are processed and reproduced so that continuous change is effected in terms of quality from the high quality signal to the low quality signal.

7. A method of transmitting a signal from a transmitting side and receiving and reproducing the transmitted signal on a receiving side in a digital broadcasting situation, the method carried out in such a manner that:

on the transmitting side, a high quality signal is created based on broadcast digital data and at least one low quality signal is created based on the same broadcast digital data so that the quality of the low quality signal is low with respect to that of the high quality signal, and the high quality signal and the low quality signal are transmitted so that one of the signals has a time lag relative to the other; and on the receiving side, the high quality signal is reproduced when a normal receiving mode is effected while the low quality signal is reproduced when a broadcast hindrance mode is effected;

wherein on the receiving side, after the broadcast hindrance mode takes place, transition to the normal receiving mode is prohibited for reproducing the high quality signal until the high quality signal is successfully received for a predetermined time duration or predetermined number of frames.

8. A method of transmitting a signal from a transmitting side and receiving and reproducing the transmitted signal on a receiving side in a digital broadcasting situation, the method carried out in such a manner that:

on the transmitting side, a high quality signal is created based on broadcast digital data and at least one low quality signal is created based on the same broadcast digital data so that the quality of the low quality signal is low with respect to that of the high quality signal, and the high quality signal and the low quality signal are transmitted so that one of the signals has a time lag relative to the other; and on the receiving side, the high quality signal is reproduced when a normal receiving mode is effected while the low quality signal is reproduced when a broadcast hindrance mode is effected;

wherein on the receiving side, if the low quality signal is not received but the high quality signal is received under condition that the broadcast hindrance mode is effected, low quality data is created from the high quality signal to recover the reproduction of the low quality signal.

9. A system composed of a transmitting apparatus for transmitting a signal and a receiving apparatus for receiving and reproducing the signal transmitted from the transmitting apparatus, both of the apparatus working in a digital broadcasting situation, the transmitting apparatus comprising:

high quality signal creating means for creating a high quality signal based on broadcast digital data;

low quality signal creating means for creating at least one low quality signal based on the same broadcast digital data, the low quality signal being created by reducing an information data amount of the high quality signal, so that the quality of the low quality signal is low with respect to that of the high quality signal; and transmitting means for transmitting the high quality signal created by the high quality signal creating means and the low quality signal created by the low quality signal creating means so that one of the signals has a time lag relative to the other, the high quality signal is transmitted by using a first channel band while the low quality signal is transmitted by using a second channel band of which width is narrower than that of the first channel band, the low quality signal being transmitted before the high quality signal is transmitted from the transmitting side, and the receiving apparatus arranged for receiving the high quality signal and the low quality signal transmitted from the transmitting apparatus, comprising:

mode determining means for determining which of a normal receiving mode and a broadcast hindrance mode is effected; and reproducing means for reproducing the high quality signal when the normal receiving mode is effected while reproducing the low quality signal when a broadcast hindrance mode is effected.

10. A transmitting apparatus for transmitting broadcasting digital data in a digital broadcasting situation, comprising:

high quality signal creating means for creating a high quality signal based on broadcast digital data;

low quality signal creating means for creating at least one low quality signal based on the same broadcast digital data, the low quality signal being created by reducing an information data amount of the high quality signal, so that the quality of the low quality signal is low with respect to that of the high quality signal; and transmitting means for transmitting the high quality signal created by the high quality signal creating means and the low quality signal created by the low quality signal creating means so that one of the signals has a time lag relative to the other, the high quality signal is transmitted by using a first channel band while the low quality signal is transmitted by using a second channel band of which width is narrower than that of the first channel band, the low quality signal being transmitted before the high quality signal is transmitted from the transmitting side.

11. A transmitting apparatus according to claim 10, wherein the high quality signal creating means, the low quality signal creating means and the transmitting means are provided in the same broadcasting station.

12. A transmitting apparatus according to claim 10, wherein
the high quality signal creating means is provided in a broadcasting station, and the low quality signal creating means and the transmitting means are provided in a broadcasting/communication satellite.

13. A transmitting apparatus according to claim 10, wherein
the low quality signal creating means is arranged to create a plurality of low quality signals different in quality from one another, and the transmitting means is arranged to transmit the plurality of low quality signals as well as the high quality signal so that each of the low quality signals and the high quality signal has a time lag relative to another.

14. A transmitting apparatus according to claim 13, wherein
the transmitting means is arranged to create the low quality signal by reducing information data amount of the high quality signal, and transmit the low quality signal before transmitting the high quality signal.

15. A transmitting apparatus according to claim 13, wherein
the high quality signal is transmitted by using a first channel band while each of the low quality signals is transmitted by using a second channel band of which each width of the low quality signals is narrower than that of the first channel band.

16. A transmitting apparatus according to claim 15, wherein
each of the second channel band is different from one another.

17. A transmitting apparatus according to claim 10, wherein the transmitting means is arranged to create the low quality signal by reducing information data amount of the high quality signal, and transmit the low quality signal before transmitting the high quality signal.

18. A transmitting apparatus according to claim 10, wherein
the high quality signal is transmitted by using a first channel band while the low quality signal is transmitted by using a second channel band of which width is narrower than that of the first channel band.

19. A receiving and reproducing apparatus for use with a transmitting apparatus and receiving and reproducing a signal transmitted from the transmitting apparatus in which a high quality signal is created based on broadcast digital data, at least one low quality signal is created based on the same broadcast digital data, the low quality signal being created by reducing an information data amount of the high quality signal, so that the low quality signal is low with respect to that of the high quality signal, and the high quality signal and the low quality signal are transmitted so that one of the signals has a time lag relative to the other, the receiving and reproducing apparatus comprising:
transmitting means for transmitting the high quality signal created by the high quality signal creating means and the low quality signal created by the low quality signal creating means so that one of the signals has a time lag relative to the other, the high quality signal is transmitted by using a first channel band while the low quality signal is transmitted by using a second channel band of which width is narrower than that of the first channel band, the low quality signal being transmitted before the high quality signal is transmitted from the transmitting side;
mode determining means for determining which of a normal receiving mode and a broadcast hindrance mode is effected; and
reproducing means for reproducing the high quality signal when the normal receiving mode is effected while reproducing the low quality signal when the broadcast hindrance mode is effected.

20. A receiving and reproducing apparatus according to claim 19, wherein
the mode determining means is arranged to detect transition going to bring about from the normal receiving mode to the broadcast hindrance mode, and
when the mode determining means detects the transition going to bring about from the normal receiving mode to the broadcast hindrance mode, the high quality signal and the low quality signal are processed and reproduced so that continuous change is effected in terms of quality of the high quality signal and the low quality signal.

21. A receiving and reproducing apparatus according to claim 19, wherein
the mode determining means is arranged such that, under condition that the broadcast hindrance mode is effected, the mode determining means does not determine that it is allowable for the normal receiving mode to take place until the high quality signal is successfully received for a predetermined time duration or predetermined number of frames, and
the reproducing means is arranged such that, when the mode determining means determines that it is allowable for the transition from the broadcast hindrance mode to the normal receiving mode to bring about, the reproducing means reproduces the high quality signal.

22. A receiving and reproducing apparatus according to claim 19, wherein
the reproducing means is arranged such that, if the low quality signal is not received but the high quality signal is received under condition that the broadcast hindrance mode is effected, the reproducing means creates low quality data from the high quality signal to recover the reproduction of the low quality signal.

23. A receiving and reproducing apparatus according to claim 19, wherein
the mode determining means arranges to determine transition going to bring about from the broadcast hindrance mode to the normal receiving mode, and
when the mode determining means detects the transition going to bring about from the broadcast hindrance mode to the normal receiving mode, the high quality signal and the quality signal are processed and reproduced so that the transition is effected smoothly in terms of quality of the high quality signal and the low quality signal.

24. A method of transmitting a signal from a transmitting side and receiving and reproducing the transmitted signal on a receiving side in a digital broadcasting situation, the method carried out in such a manner that:
on the transmitting side, a high quality signal is created based on broadcast digital data and at least one low quality signal is created based on the same broadcast digital data so that the quality of the low quality signal is low with respect to that of the high quality signal, and the high quality signal and the low quality signal are transmitted so that one of the signals has a time lag relative to the other; and
on the receiving side, the high quality signal is reproduced when a normal receiving mode is effected while the low quality signal is reproduced when a broadcast hindrance mode is effected;

wherein, after the broadcast hindrance mode is effected on the receiving side, a fact that the high quality signal has been continuously received for a predetermined number of frames, leads to a transition to the normal receiving mode in which the high quality signal is selected for reproduction, using one method chosen of any method;

a cross-fade method which the high quality signal data is weighted with a gradually decreasing weight coefficient while the low quality signal data is weighted with a gradually increasing weight coefficient, and both of the data are overlaid on each other;

an averaging processing method with weighting in such a manner that, between the timing points T1 and T0, a weighting function of which value gradually decreases to zero is applied to the data while between the timing points T0 and T2, a weighting function of which value gradually increases from zero is applied to the data; and an interpolation and synthesis method which data for interpolation and synthesis may be created from data of the high quality signal and the low quality signal having been received so far and having been subjected to the decoding processing.

\* \* \* \* \*

UNITED STATES PATENT AND TRADEMARK OFFICE
CERTIFICATE OF CORRECTION

PATENT NO.    : 6,535,717 B1
DATED         : March 18, 2003
INVENTOR(S)   : K. Matsushima et al.

It is certified that error appears in the above-identified patent and that said Letters Patent is hereby corrected as shown below:

<u>Title page,</u>
Item [73], Assignee, please add:
-- FCC LIMITED
1, Fujimachi, Hino-Shi --

Signed and Sealed this

Fourth Day of May, 2004

JON W. DUDAS
*Acting Director of the United States Patent and Trademark Office*